US012718495B2

(12) United States Patent
Du et al.

(10) Patent No.: US 12,718,495 B2
(45) Date of Patent: Aug. 25, 2026

(54) OBJECT CONTROL METHOD AND APPARATUS IN VIRTUAL SCENE, TERMINAL DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Dandan Du, Shenzhen (CN); Guangxin Wang, Shenzhen (CN); Dekui Chen, Shenzhen (CN); Jianquan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 18/206,562

(22) Filed: Jun. 6, 2023

(65) Prior Publication Data

US 2023/0310989 A1 Oct. 5, 2023

Related U.S. Application Data

(63) Continuation of application No. PCT/CN2022/120460, filed on Sep. 22, 2022.

(30) Foreign Application Priority Data

Oct. 20, 2021 (CN) ......................... 202111220651.8
Dec. 31, 2021 (CN) ......................... 202111672726.6

(51) Int. Cl.
*G06T 19/00* (2011.01)
*G06F 3/0346* (2013.01)

(52) U.S. Cl.
CPC .......... *G06T 19/006* (2013.01); *G06F 3/0346* (2013.01)

(58) Field of Classification Search
CPC .............................. G06T 19/00; G06F 3/0346
See application file for complete search history.

(56) References Cited

U.S. PATENT DOCUMENTS

2006/0019614 A1* 1/2006 Yamasaki ............. G06F 1/1671 348/E5.145
2014/0364209 A1* 12/2014 Perry ...................... A63F 13/71 463/31

(Continued)

FOREIGN PATENT DOCUMENTS

CN 106178504 A 12/2016
CN 108245887 A 7/2018

(Continued)

OTHER PUBLICATIONS

Tencent Technology, Japanese Office Action, JP Patent Application No. 2023-571741, Aug. 28, 2024, 11 pgs.

(Continued)

*Primary Examiner* — Michelle L Sams
(74) *Attorney, Agent, or Firm* — Morgan, Lewis & Bockius LLP

(57) ABSTRACT

This application provides a method of controlling an object in a virtual scene performed by a terminal device. The method includes: displaying a virtual scene in a human-computer interaction interface; controlling a posture of a virtual object in the virtual scene to tilt in response to a first rotation operation of the terminal device around a first reference axis perpendicular to the interaction interface; controlling a lens of the virtual scene to rotate around a second rotation reference axis parallel to a width direction of the interaction interface in response to a second rotation operation of the terminal device around the second rotation (Continued)

reference axis; and controlling the lens of the virtual scene to rotate around a third rotation reference axis parallel to a length direction of the interaction interface in response to a third rotation operation of the terminal device around the third rotation reference axis.

17 Claims, 21 Drawing Sheets

(56) References Cited

U.S. PATENT DOCUMENTS

| | | | | |
|---|---|---|---|---|
| 2015/0347080 | A1* | 12/2015 | Shin | G06F 3/012 345/173 |
| 2016/0171335 | A1 | 6/2016 | Aguilera Perez et al. | |
| 2017/0345194 | A1* | 11/2017 | Park | A63F 13/42 |
| 2018/0184000 | A1* | 6/2018 | Lee | G06F 3/0484 |
| 2020/0298121 | A1 | 9/2020 | Deng | |
| 2021/0201591 | A1* | 7/2021 | Liu | G06T 19/006 |

FOREIGN PATENT DOCUMENTS

| | | | |
|---|---|---|---|
| CN | 108245893 | A | 7/2018 |
| CN | 114053693 | A | 2/2020 |
| CN | 111026277 | A | 4/2020 |
| CN | 113926187 | A | 1/2022 |
| JP | 2021512413 | A | 5/2021 |
| JP | 2021512418 | A | 5/2021 |
| WO | WO 2020029556 | A1 | 2/2020 |
| WO | WO 2020/224361 | A1 | 11/2020 |
| WO | WO 2021/022967 | A1 | 2/2021 |
| WO | WO 2021/036581 | A1 | 3/2021 |
| WO | WO 2021/043069 | A1 | 3/2021 |
| WO | WO 2021/139371 | A1 | 7/2021 |
| WO | WO 2021/203831 | A1 | 10/2021 |
| WO | WO 2021/227733 | A1 | 11/2021 |

OTHER PUBLICATIONS

Tencent Technology, Japanese Office Action, JP Patent Application No. 2023-571741, Dec. 18, 2024, 10 pgs.

Tencent Technology, ISR, PCT/CN2022/120460, Dec. 15, 2022, 3 pgs.

Tencent Technology, WO, PCT/CN2022/120460, Dec. 15, 2022, 5 pgs.

Tencent Technology, IPRP, PCT/CN2022/120460, Apr. 23, 2024, 6 pgs.

Tencent Technology, Singaporean Written Opinion, SG Patent Application No. 11202306748S, Jan. 14, 2026, 7 pgs.

* cited by examiner

OBJECT CONTROL METHOD AND APPARATUS IN VIRTUAL SCENE, TERMINAL DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/120460, entitled "OBJECT CONTROL METHOD AND APPARATUS IN VIRTUAL SCENE, TERMINAL DEVICE, COMPUTER-READABLE STORAGE MEDIUM, AND COMPUTER PROGRAM PRODUCT" filed on Sep. 22, 2022, which claims priority to (i) Chinese Patent Application No. 202111220651.8 filed on Oct. 20, 2021 and entitled "OBJECT CONTROL METHOD AND APPARATUS IN VIRTUAL SCENE, AND TERMINAL DEVICE", and (ii) Chinese Patent Application No. 202111672726.6 filed on Dec. 31, 2021 and entitled "OBJECT CONTROL METHOD AND APPARATUS IN VIRTUAL SCENE, AND TERMINAL DEVICE", all of which is incorporated by reference in its entirety.

FIELD OF THE TECHNOLOGY

This application relates to computer technologies, and in particular, to an object control method and apparatus in a virtual scene, a terminal device, a computer-readable storage medium, and a computer program product.

BACKGROUND OF THE DISCLOSURE

At present, a virtual object is generally controlled to change a posture by clicking virtual keys displayed on a human-computer interaction interface when a user controls the virtual object to play a game.

A plurality of virtual interaction keys are generally set on the human-computer interaction interface, which are used for associating a plurality of virtual postures of the virtual object or adjusting a lens direction in a virtual scene. This setting obstructs a game picture. In a case of simultaneously controlling actions of the virtual object and controlling a virtual lens direction, the user needs to perform pressing operations with a plurality of fingers, it also takes some time to select corresponding keys from the plurality of virtual interaction keys, it is difficult for the user to operate, and the efficiency of controlling the virtual scene is affected.

SUMMARY

Embodiments of this application provide an object control method and apparatus in a virtual scene, a device, a computer program product, and a computer-readable storage medium, which can improve the efficiency of controlling the virtual scene, and save computing resources required for displaying virtual keys.

Technical solutions of the embodiments of this application are implemented as follows:

An embodiment of this application provides a method of controlling an object in a virtual scene performed by a terminal device, the method comprising:

displaying a virtual scene in a human-computer interaction interface, the virtual scene including a virtual object;

controlling a posture of the virtual object to tilt to a left direction or a right direction of the virtual object in response to a first rotation operation of the terminal device around a first reference axis perpendicular to the human-computer interaction interface; and displaying the virtual scene in a viewing perspective corresponding to the tilted posture of the virtual object, An embodiment of this application provides a terminal device for controlling an object in a virtual scene. The electronic device includes:

a memory, configured to store executable instructions; and a processor, configured to implement any object control method in a virtual scene provided by the embodiments of this application when executing the executable instructions stored in the memory.

An embodiment of this application provides a non-transitory computer-readable storage medium, storing executable instructions, and configured to implement any object control method in a virtual scene provided by the embodiments of this application when executed by a processor of a terminal device.

The embodiments of this application have the following beneficial effects:

Rotation operations are performed around different rotation reference axes corresponding to a terminal device to control the posture of the virtual object in the virtual scene displayed in the human-computer interaction interface or control the lens of the virtual scene. The posture of the virtual object or the lens of the virtual scene is controlled by rotation operations instead of traditional key operations. The user does not need to simultaneously perform pressing operations with a plurality of fingers to control the posture of the virtual object or control the rotation of the lens. Since the keys set on the human-computer interaction interface are saved, the obstruction of the human-computer interaction interface is reduced, and the efficiency of controlling the virtual scene is improved.

DESCRIPTION OF EMBODIMENTS

Figure 1A:
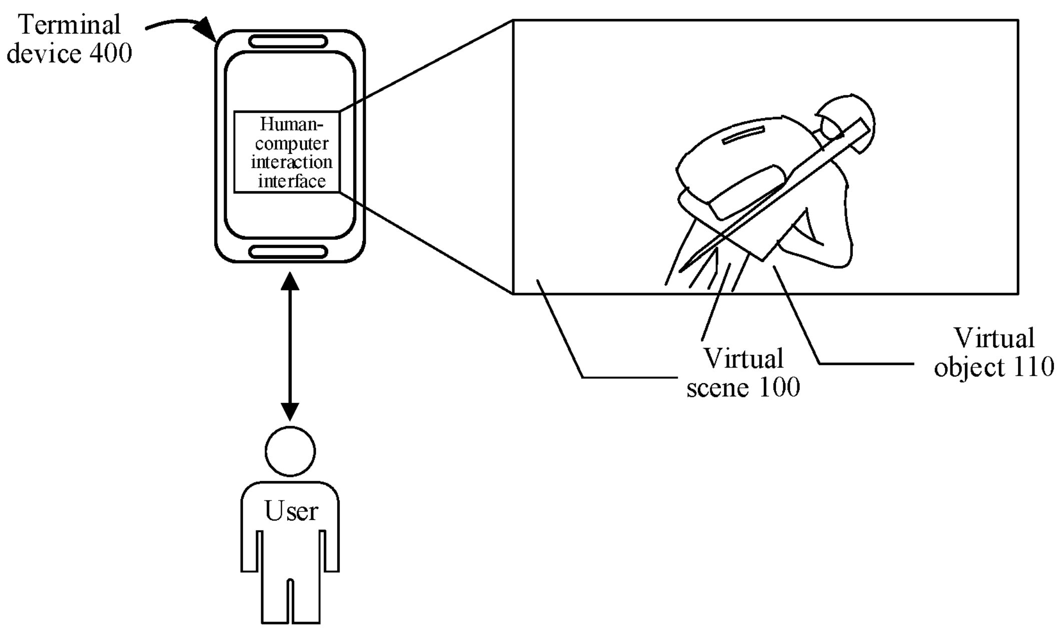
FIG. 1A is a schematic diagram of an application mode of an object control method in a virtual scene provided by an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

"Some embodiments" involved in the following descriptions describes a subset of all possible embodiments. However, it can be understood that "some embodiments" may be the same subset or different subsets of all the possible embodiments, and may be combined without conflicts.

The term "first/second/third" involved in the description below is only for distinguishing similar objects and does not represent a specific sequence of the objects. It can be understood that "first/second/third" may be interchanged to specific sequences or orders if allowed to implement the embodiments of the present application described herein in sequences except the illustrated or described ones.

Unless otherwise defined, meanings of all technical and scientific terms used in this specification are the same as those usually understood by a person skilled in the art to which this application belongs. The terms used herein are only intended to describe the embodiments of the present application, and are not intended to limit the present application.

In an embodiment of this application, relevant data such as user information and user feedback data is involved. When the embodiments of this application are applied to a specific product or technology, user permission or consent needs to be acquired, and the collection, use, and processing of the relevant data need to comply with relevant laws, regulations, and standards of relevant countries and regions.

Before the embodiments of this application are further described in detail, a description is made on nouns and terms in the embodiments of this application, and the nouns and terms in the embodiments of this application are applicable to the following explanations.

1) Response to: it is used for representing a dependent condition or state of a performed operation. When the depended condition or state is satisfied, the performed one or a plurality of operations may be real-time, or may also have a set delay. There is no limit to a performing order for the plurality of operations performed unless otherwise stated.

2) Virtual scene: it is a virtual scene that is displayed (or provided) when an application runs on an electronic device. The virtual scene may be a real-world simulation environment, a semi-simulation semi-fictional virtual scene, or a purely fictional virtual scene. The virtual scene may be any one of a two-dimensional virtual scene, a 2.5-dimensional virtual scene, or a three-dimensional virtual scene, and the dimensions of the virtual scene are not limited in the embodiments of this application. For example, the virtual scene may include the sky, a land, a sea, and the like. The land may include an environmental element such as a desert and a city, and a user may control a virtual object to move in the virtual scene.

3) Virtual object: it is an object that perform interaction in a virtual scene, or an object that can still, move, and perform various actions in the virtual scene under the control of a user or a robot program (such as an artificial intelligence-based robot program), for example, various roles in a game.

4) A third personal shooting (TPS) game: it refers to that a game player can observe an operated character through a game picture. The difference between a first-person shooting (FPS) game and the TPS game is that only the perspective of a protagonist is displayed on a screen in the FPS game, while the protagonist in the TPS game is visible in a game screen.

5) Rotation reference axis: it refers to each axis of a spatial rectangular coordinate system corresponding to a terminal device, and all rotation reference axes are perpendicular to one another. One axis of the spatial rectangular coordinate system is perpendicular to a plane used for performing human-computer interaction of the electronic device, and a plane formed by the other two axes is parallel to the plane used for performing human-computer interaction of the electronic device.

6) Gyroscope: it is an angular motion detection apparatus configured to detect information, such as an angle and an angular velocity of rotation around each rotation reference axis.

7) Lens: it is a tool for viewing a virtual scene, which displays a picture of the virtual scene on a display screen by photographing partial region of the virtual scene. Taking a game as an example, a game picture is acquired by shooting the partial region of the virtual scene by a lens, and a user (for example, a player) may view pictures of different regions in the virtual scene by controlling a lens to move.

Taking a virtual scene being a game scene as an example, a user often controls a virtual object to change a posture by pressing corresponding keys with fingers if the posture of the virtual object needs to be adjusted in a game. If the user wants to adjust a lens direction of the virtual scene, then he or she needs to use a finger to swipe on a human-computer interaction interface to control the lens direction. That is, a large number of virtual keys need to be set on the human-computer interaction interface to associate various postures of the virtual object, which causes excessive obstruction to the human-computer interaction interface and results in a poor user visual experience. The number of the keys is too large, which is inconvenient for the user to select corresponding keys. For more complex operations, the user needs to use multiple fingers to click the keys or slide a screen at the same time, making it more difficult to operate.

For the above technical problems, the embodiments of this application provide an object control method in a virtual scene, an object control apparatus in a virtual scene, a terminal device, a computer-readable storage medium, and a computer program product. In order to facilitate an easier understanding of the object control method in a virtual scene provided by the embodiment of this application, an exemplary implementation scene of the object control method in a virtual scene provided by the embodiment of this application is described first. The virtual scene may be output completely based on the terminal device, or based on the collaboration of the terminal device and a server.

The method provided by the method provided in the embodiment of this application may be applied to a virtual reality application, a three-dimensional map program, an FPS, a TPS game, a multiplayer online battle arena (MOBA) game, and the like. The embodiments below are described by taking an application in a game as an example.

An application scene is introduced below in combination with the terminal device.

In one implementation scene, refer to FIG. 1A, which is a schematic diagram of an application mode of an object control method in a virtual scene provided by an embodiment of this application. The implementation scene is applicable to some application modes in which relevant data calculation of a virtual scene 100 may be completed by completely relying on computing power of graphics processing hardware of a terminal device 400, for example, a game in a stand-alone version/an offline mode, where the output of the virtual scene is completed through different types of terminal devices 400, such as smartphones, tablet computers, and virtual reality/augmented reality devices.

When visual perception of the virtual scene 100 is formed, the terminal device 400 calculates display data required for displaying through the graphics processing hardware, and completes loading, parsing, and rendering of the display data. A video frame which can form the visual perception of the virtual scene is output by graphic output hardware. For example, a two-dimensional video frame is presented on a screen of a smartphone, or, a video frame which achieves a three-dimensional display effect is projected on lenses of augmented reality/virtual reality glasses. In addition, in order to enrich a perceptual effect, the terminal device 400 may further form one or more of auditory perception, tactile perception, motion perception, and gustatory perception by means of different hardware.

As an example, the terminal device 400 runs a game application of a stand-alone version. In a process of running the game application, a virtual scene with action role-playing is output. The virtual scene may be an environment for game roles to interact, for example, may be a plain, a street, or a valley for the game roles to battle. Taking displaying the virtual scene in a third-person perspective as an example, a virtual object is displayed in the virtual scene. The virtual scene displays a virtual object. The virtual object is a game role controlled by a real user, and moves in the virtual scene in response to an operation of the real user for a controller (for example, a gyroscope, a touch screen, a voice operated switch, a keyboard, a mouse, and a rocker bar). For example: when the real user clicks a virtual key on a touch screen, the virtual object will perform an action associated with the virtual key.

The terminal devices 400 may be various types of mobile devices, such as a smartphone, a tablet computer, a handheld game terminal, an augmented reality device, and a virtual reality device. Taking a mobile terminal as an example, referring to FIG. 1A, a virtual scene is displayed through a display screen of the mobile terminal. The virtual scene includes a virtual object. A gyroscope (the embodiment of this application does not limit an angular motion detection apparatus as a gyroscope, and other angular motion detection apparatuses may also be used when other angular motion detection apparatus may implement a solution of the embodiment of this application) is arranged in the mobile terminal, and the gyroscope is used for detecting a rotation operation for the terminal device. Three axes in the rotation reference axes corresponding to the mobile terminal respectively correspond to different control modes. When a rotation operation is received through the gyroscope, the mobile terminal controls the virtual object or a lens of the virtual scene according to a rotation reference axis corresponding to the rotation operation. Through the rotation operations around different rotation reference axes, a user can control a posture of the virtual object to be adjusted or control the lens of the virtual scene to be adjusted without clicking a key, which improves the efficiency of controlling the virtual scene.

Figure 1B:
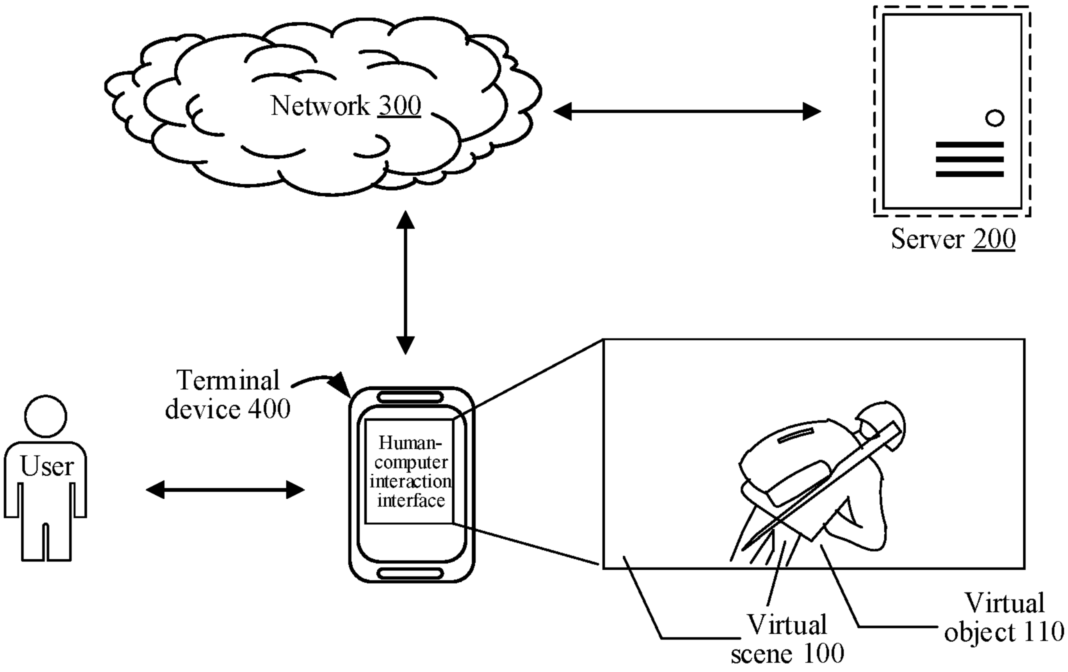
FIG. 1B is a schematic diagram of an application mode of an object control method in a virtual scene provided by an embodiment of this application.

Before describing FIG. 1B, a game mode involved in a solution implemented by the collaboration of a terminal device and a server. For the solution implemented by the collaboration of the terminal device and the server, two game modes are involved, which are respectively a local game mode and a cloud game mode. The local game mode refers to that the terminal device and the server run game processing logic collaboratively. For operation instructions input by a user (for example, a player) in the terminal device, game logic processing is run for part by the terminal device, and game logic processing is run for the other part by the server. In addition, the game logic processing run by the server is often more complex and needs to consume more hash rate. The cloud game mode refers to that the game logic processing is run by the server completely; and a cloud server renders game scene data into an audio-video stream, and the audio-video stream is transmitted through a network to the terminal device for displaying. The terminal device only needs to have a basic capacity of playing streaming media and a capacity of acquiring operation instructions of the user (for example, the player) and transmitting the operation instructions to the server.

In another implementation scene, refer to FIG. 1B, which is a schematic diagram of an application mode of an object control method in a virtual scene provided by an embodiment of this application, is applied to a terminal device 400 and a server 200, and is applicable to an application mode in which the calculation of the virtual scene is completed relying on the computing power of the server 200 and the virtual scene is output at the terminal device 400.

Taking forming the visual perception of the virtual scene 100 as an example, the server 200 performs calculation on relevant display data of the virtual scene (for example, scene data) and transmits the relevant display data to the terminal device 400 through a network 300. The terminal device 400 completes loading, parsing, and rendering of the calculated display data relying on the graphics calculation hardware, and outputs the virtual scene relying on graphics output hardware to form the visual perception. For example, a two-dimensional video frame may be represented on a display screen of a smartphone, or, a video frame which achieves a three-dimensional display effect is projected on the lenses of the augmented reality/virtual reality glasses. For the perception in a form of the virtual scene, it is to be understood that, it may be output by means of corresponding hardware of the terminal device 400, for example, auditory perception is formed by using a microphone, and tactile perception is formed by using a vibrating motor.

As an example, the terminal device 400 runs a client (for example, a game application of a network version), and performs game interaction by connecting a game server (that is, the server 200) and other users. The terminal device 400 outputs a virtual scene of the game application. The virtual scene may be an environment for game roles to interact, for example, may be a plain, a street, or a valley for the game roles to battle. Taking displaying the virtual scene in a third-person perspective as an example, a virtual object is displayed in the virtual scene. The virtual scene displays a virtual object. The virtual object is a game role controlled by a real user, and moves in the virtual scene in response to an operation of the real user for a controller (for example, a gyroscope, a touch screen, a voice operated switch, a keyboard, a mouse, and a rocker bar). For example: when the real user clicks a virtual key on a touch screen, the virtual object will perform an action associated with the virtual key.

As an example, the terminal device 400 receives a first rotation operation and transmits a signal to the server 200. The server 200 tilts the posture of the virtual object according to the signal, and issues display data that represents a posture of the virtual object to the terminal device 400, so that the terminal device 400 displays to the user that the posture of the virtual object tilts to a left direction or a right direction.

In some embodiments of this application, the terminal device receives control signals transmitted by other electronic devices, and controls a virtual object in a virtual scene according to the control signals. The other electronic devices may be a handle device (for example: a wired handle device, a wireless handle device, and a wireless remote controller) and a gyroscope is arranged inside. When receiving a rotation operation, the handle device generates a corresponding control signal according to the rotation operation, and transmits the control signal to the terminal device. The terminal device controls, according to the control signal, the posture of the virtual object in the virtual scene to tilt to the left direction or the right direction of the virtual object.

In some embodiments of this application, the terminal device receives control signals transmitted by other electronic devices, and controls a virtual object in a virtual scene according to the control signals. The other electronic devices may be a wearable device (for example: an earphone, a helmet, and a smart bracelet) and a gyroscope is arranged inside. When receiving a rotation operation, the wearable device generates a corresponding control signal according to the rotation operation, and transmits the control signal to the terminal device. The terminal device controls, according to the control signal, the posture of the virtual object in the virtual scene to tilt to the left direction or the right direction of the virtual object. If the other electronic devices are paired wearable devices, for example, a Bluetooth earphone, gyroscopes are respectively arranged on a left ear part and a right ear part of the wearable device.

The other electronic devices may also be a handle device, for example: a game handle. A gyroscope is arranged inside the game handle. When receiving a rotation operation, the game handle generates a corresponding control signal according to the rotation operation, and transmits the control signal to the terminal device. The terminal device controls, according to the control signal, the posture of the virtual object in the virtual scene to tilt to the left direction or the right direction of the virtual object. Or, a lens direction is rotated.

In some embodiments, the terminal device 400 may implement the object control method in a virtual scene provided by an embodiment of this application by running a computer program. For example, the computer program may be a native application or a software module in an operating system, may be a native application (APP), that is, a program running in a terminal device, such as an original application or a software module in an operation system, and a native application (APP), that is a game APP that can run by only installing in the operating system, for example, a game APP (that is, the above client), may also be an applet, that is, an application that can be run only by downloading into a browser environment, or may also be a game applet that can be embedded into any APP. In conclusion, the above computer program may be an application, a module, or a plug-in in any form.

The embodiment of this application may be implemented by cloud technology. The cloud technology refers to a collocation technology which unifies series of resources such as hardware, software, and networks in a wide area network or a local area network to realize calculation, storage, processing, and sharing of data.

The cloud technology is a collective name of a network technology, an information technology, an integrated technology, a management platform technology, an application technology, and the like applied based on a cloud computing business model, can form a resource pool, can be used as required, and is flexible and convenient. A cloud computing technology will become an important support. Background service of a technical network system requires a large amount of computing and storage resources.

As an example, the server 200 may be an independent physical server, or may also be a server cluster or a distributed system composed of a plurality of physical servers, or may also be a cloud server providing basic cloud computing services such as a cloud server, a cloud database, cloud computing, a cloud function, cloud storage, a network service, cloud communication, a middleware service, a domain name service, a security service, a content delivery network (CDN), big data, and an artificial intelligence platform. The terminal device 400 may be a smartphone, a tablet computer, a notebook computer, a desktop computer, a smart speaker, a smartwatch, or the like, but is not limited thereto. The terminal device 400 and the server 200 may be directly or indirectly connected in a wired or wireless communication mode. No limits are made thereto in the embodiments of this application.

Figure 2:
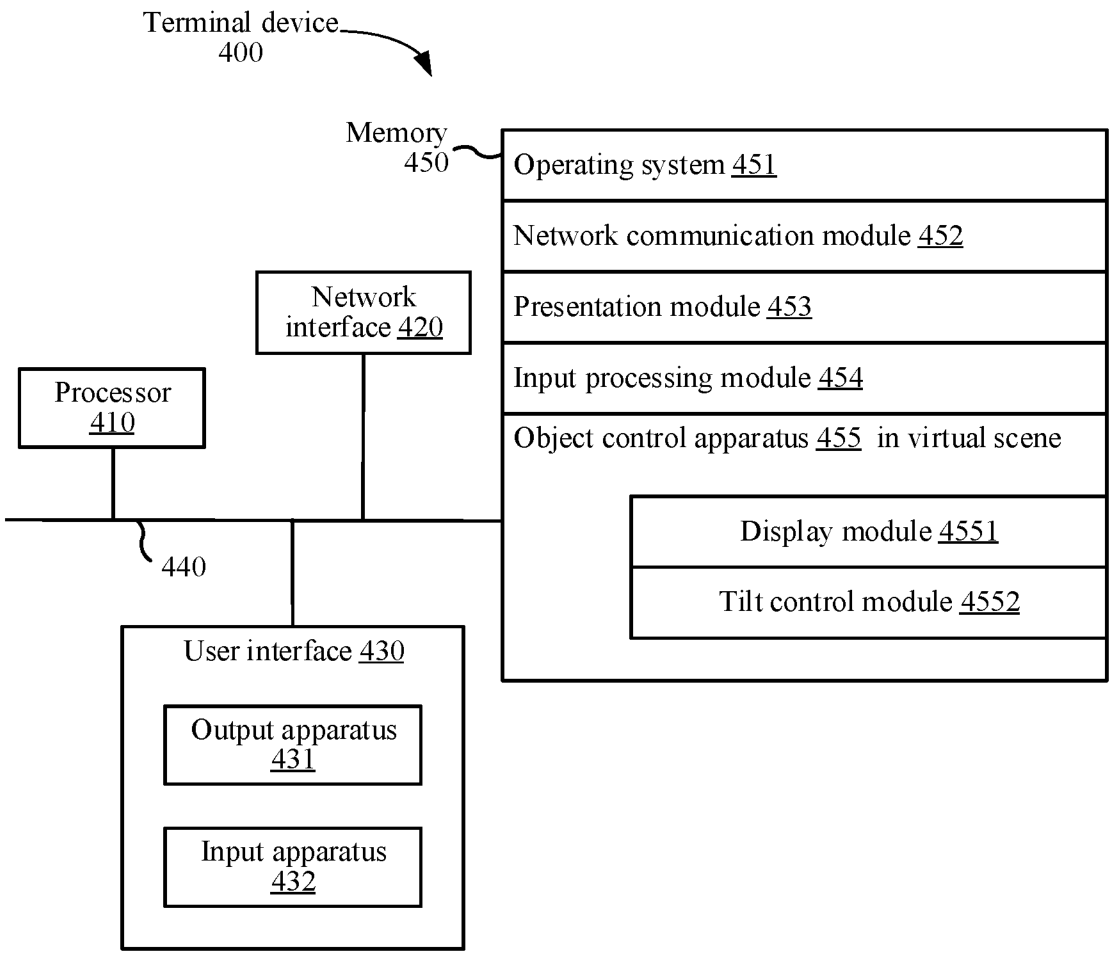
FIG. 2 is a schematic structural diagram of a terminal device 400 provided by an embodiment of this application.

Refer to FIG. 2, which is a schematic structural diagram of a terminal device 400 provided by an embodiment of this application. The terminal device 400 as shown in FIG. 2 includes: at least one processor 410, a memory 450, at least one network interface 420, and a user interface 430. Various components in the terminal device 400 are coupled together by using a bus system 440. It may be understood that the bus system 440 is configured to implement connection and communication between these components. In addition to a data bus, the bus system 440 further includes a power bus, a control bus, and a state signal bus. However, for clarity of description, various buses are marked as the bus system 440 in FIG. 2.

The processor 410 may be an integrated circuit chip having a signal processing capability, for example, a general processor, a digital signal processor (DSP), or other programmable logic devices, discrete gates or transistor logic devices, or discrete hardware components, or the like. The general processor may be a microprocessor, any conventional processor, or the like.

The user interface 430 includes one or more output apparatuses 431 that can present media content, which includes one or more speakers and/or one or more visual display screens. The user interface 430 further includes one or more input apparatuses 432, which includes a user interface component that facilitates user input, for example, a keyboard, a mouse, a microphone, a touch display screen, a camera, and other input keys and controls.

The memory 450 may be removable, non-removable, or a combination thereof. An exemplary hardware device includes a solid state memory, a hard disk drive, an optical disk drive, and the like. The memory 450 optionally includes one or more storage devices that are located physically away from the processor 410.

The memory 450 includes a volatile memory or a non-volatile memory, or may include both a volatile memory and a non-volatile memory. The non-volatile memory may be a read only memory (ROM), and the volatile memory may be random access memory (RAM). The memory 450 described in the embodiment of this application aims to include any other suitable type of memory.

In some embodiments, the memory 450 can store data to support various operations. Examples of the data include a program, a module, a data structure, or a subset or a superset thereof, which are exemplarily described below.

An operating system 451 includes system programs for processing various basic services and performing hardware related tasks, for example, a frame layer, a core library layer, and a drive layer, and is configured to implement various basic services and processing hardware-based tasks.

A network communication module 452 is configured to reach other computing devices through one or more (wired or wireless) network interfaces 420. An exemplary network interface 420 includes: Bluetooth, wireless fidelity (WiFi), a universal serial bus (USB), and the like.

A presentation module 453 is configured to be capable of presenting information through one or more output apparatuses 431 (such as a display screen and a loudspeaker) associated with the user interface 430 (for example, a user interface configured to operate a peripheral device and display content and information).

An input processing module 454 is configured to detect one or more user inputs or interactions from one or one of more input apparatuses 432 and translate the detected input or interaction.

In some embodiments, an object control apparatus in a virtual scene provided by an embodiment of this application may be implemented in a software mode. FIG. 2 shows an object control apparatus 455 in a virtual scene stored in the memory 450, which may be software in a form of a program or a plugin, and includes the following software modules: a display module 4551 and a tilt control module 4552. These modules are logical ones, so they can be arbitrarily combined or further divided according to functions to be realized. It is to be pointed out that, in FIG. 2, for the convenience of expression, the above modules are shown at once. However, it is not to be considered that the object control apparatus 455 in the virtual scene excludes an implementation that may only include the display module 4551. The functions of each module will be described below.

Figures 3A, 3B:
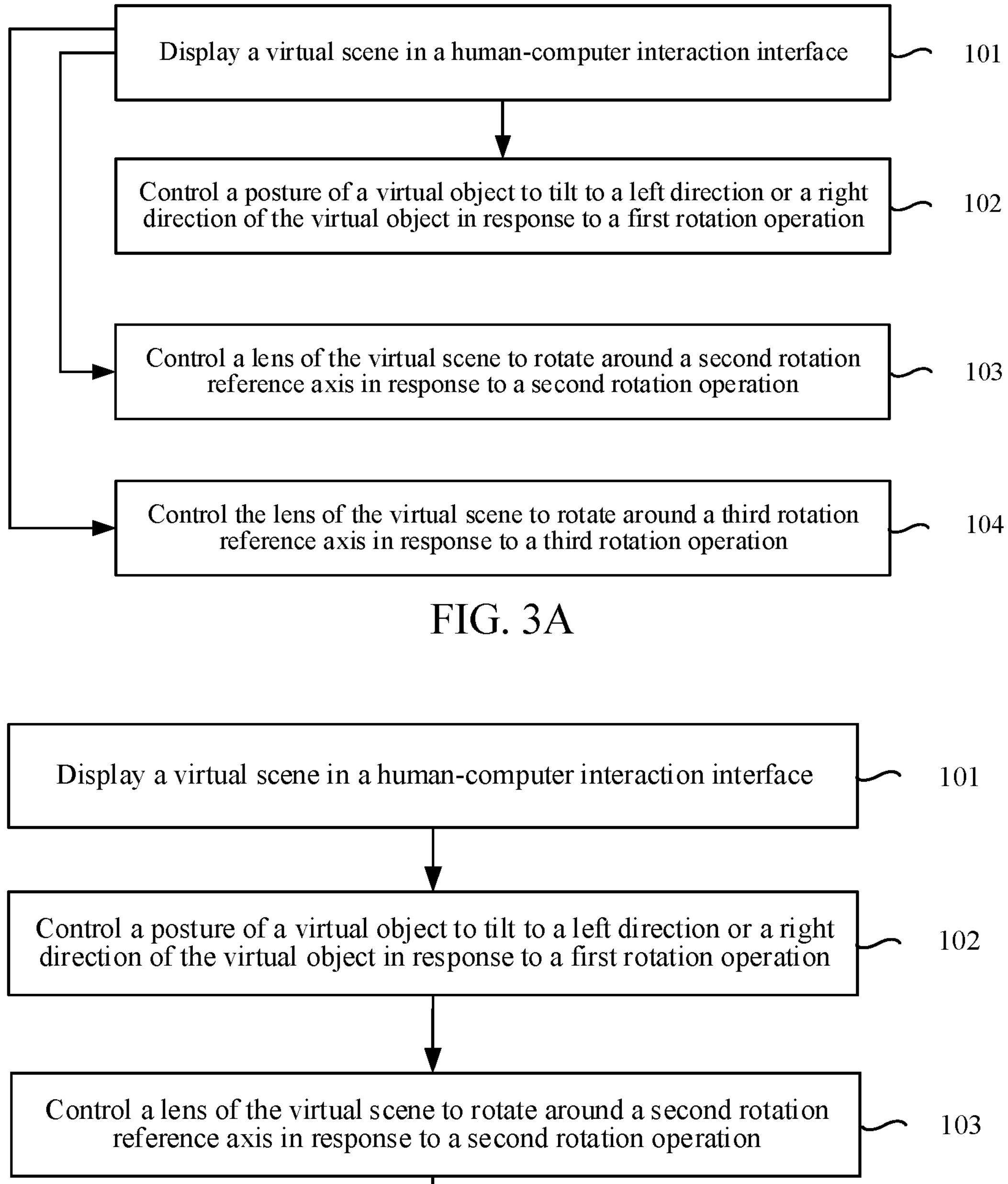
FIG. 3A is a schematic flowchart of an object control method in a virtual scene provided by an embodiment of this application.
FIG. 3B is a schematic flowchart of an object control method in a virtual scene provided by an embodiment of this application.

Refer to FIG. 3A, which is an optional schematic flowchart of an object control method in a virtual scene provided by an embodiment of this application. A process of controlling a posture of a virtual object in the virtual scene displayed in a human-computer interaction interface by performing rotation operations around different rotation reference axes will be described below with reference to FIG. 3A, and meanwhile, is described by taking an execution subject being a terminal device as an example.

The object control method in the virtual scene provided by an embodiment of this application may be independently performed by the terminal device 400 in FIG. 1A, or may also be collaboratively performed by the terminal device 400 and the server 200 in FIG. 1B.

Taking performing collaboratively by the terminal device 400 and the server 200 as an example, step 102 of controlling a posture of the virtual object to tilt to a left direction or a right direction of the virtual object may be collaboratively performed by the terminal device 400 and the server 200. After calculating display data of the posture of the virtual object, the server 200 returns the display data to the terminal device 400 for displaying. For example, step 103 of rotating a lens of the virtual scene around a second rotation reference axis may be collaboratively performed by the terminal device 400 and the server 200. After calculating display data of a rotation of the lens in the virtual scene, the server 200 returns the display data to the terminal device 400 for displaying.

Taking performing independently by the terminal device 400 as an example, step 102 of controlling a posture of the virtual object to tilt to a left direction or a right direction of the virtual object may be independently performed by the terminal device 400. When a gyroscope of the terminal device 400 senses a first rotation operation for the terminal device 400, the virtual object in the virtual scene is controlled to tilt to the left direction or the right direction according to the first rotation operation. A human-computer interaction interface of the terminal device 400 correspondingly displays a posture change of the virtual object.

Taking performing collaboratively by the terminal device 400 and other electronic devices (for example: a handle device, and a wearable device) as an example, step 102 of controlling a posture of the virtual object to tilt to a left direction or a right direction of the virtual object may be collaboratively performed by the terminal device 400 and the other electronic devices. In response to a first rotation operation for the terminal device, the electronic device senses the first rotation operation through a built-in gyroscope, and transmits a control signal corresponding to the first rotation operation to the terminal device 400. The terminal device 400 controls the virtual object to tilt to the left direction or the right direction according to the control signal. A human-computer interaction interface of the terminal device 400 correspondingly displays a posture change of the virtual object.

The following describes by taking an example in which the object control method in the virtual scene provided by an embodiment of this application is independently performed by the terminal device 400 (referred to as a terminal device hereinafter) in FIG. 1A. Refer to FIG. 3A, which is a schematic flowchart of an object control method in a virtual scene provided by an embodiment of this application and will be described with reference to steps shown in FIG. 3A.

The method shown in FIG. 3A may be performed by various forms of computer programs running on the terminal device 400, which is not limited to an above client, such as an operating system 451, a software module, and a script mentioned above. Therefore, the client is not to be considered as a limitation to the embodiment of this application.

In step 101, a virtual scene is displayed in a human-computer interaction interface.

As an example, the terminal device has a graphic computing capacity and a graphics output capacity, and may be a smartphone, a tablet computer, augmented reality/virtual reality glasses, and the like. In step 101 and subsequent steps, the human-computer interaction interface of the terminal device displays the virtual scene. The virtual scene is an environment providing game role interaction, for example, may be a plain, a street, or a valley for the game roles to battle. A virtual object is a game role controlled by a user (or referred to as a player), that is, the virtual object is controlled by a real user, and will move in the virtual scene in response to an operation of the real user for an input processing module 454 (including a touch screen, a voice operated switch, a keyboard, a mouse, a rocker bar, a gyroscope, and the like).

In step 102, a posture of the virtual object is controlled to tilt to a left direction or a right direction of the virtual object in response to a first rotation operation.

In some embodiments, the first rotation operation is a rotation operation for an electronic device around a first rotation reference axis. The first rotation reference axis corresponding to the first rotation operation is perpendicular to the human-computer interaction interface of the electronic device. The electronic device and the terminal device that performs the object control method in the virtual scene of the embodiment of this application may be the same device, and the electronic device and the terminal device may also be different devices.

Figure 5:
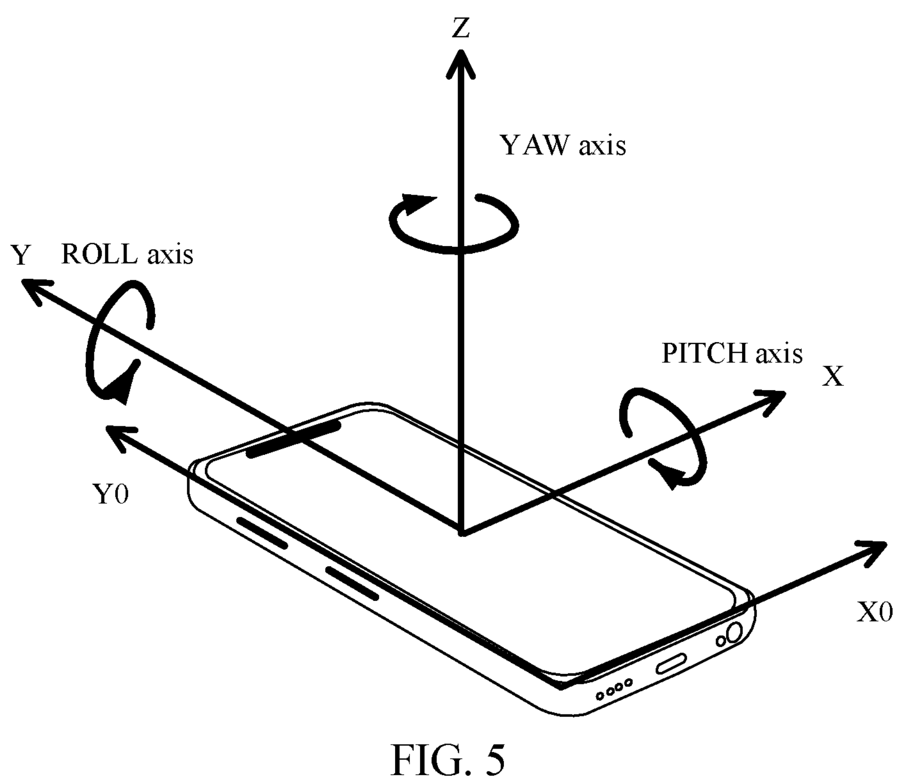
FIG. 5 is a schematic axial diagram of an electronic device provided by an embodiment of this application.

A coordinate system where the first reference axis is located is described by taking the electronic device as a reference object. Refer to FIG. 5, which is a schematic axial diagram of an electronic device provided by the embodiment of this application. FIG. 5 exemplarily shows a case in which the electronic device is a mobile terminal. A display screen of the mobile terminal displays a human-computer interaction interface. When the mobile terminal is in a landscape mode, a first rotation reference axis (the YAW axis) is upward perpendicular to the human-computer interaction interface (a direction pointed by an arrow of a reference axis Z0 in FIG. 5), a second rotation reference axis (a ROLL axis) is parallel to a width direction of the human-computer interaction interface (a direction pointed by an arrow of a reference axis Y0 in FIG. 5), and a third rotation reference axis (a PITCH axis) is parallel to a length direction of the human-computer interaction interface (a direction pointed by an arrow of a reference axis X0 in FIG. 5). Similarly, when the electronic device is in a portrait mode, the first rotation reference axis (the YAW axis) is perpendicular to the human-computer interaction interface, then a positive direction is a direction opposite to the direction of viewing the display screen, that is, the direction pointed by the arrow of the reference axis Z0 in FIG. 5, the second rotation reference axis (the ROLL axis) is parallel to the length direction of the human-computer interaction interface, that is, the direction pointed by the arrow of the reference axis Y0 in FIG. 5, and the third rotation reference axis (the PITCH axis) is parallel to the width direction of the human-computer interaction interface, that is, the direction pointed by the arrow of the reference axis X0 in FIG. 5.

Here, the left direction or the right direction of the virtual object is determined with reference to self-perception of the virtual object, and may be consistent with or opposite to the left direction or the right direction perceived by a user, which is exemplarily described below.

Figure 11A:
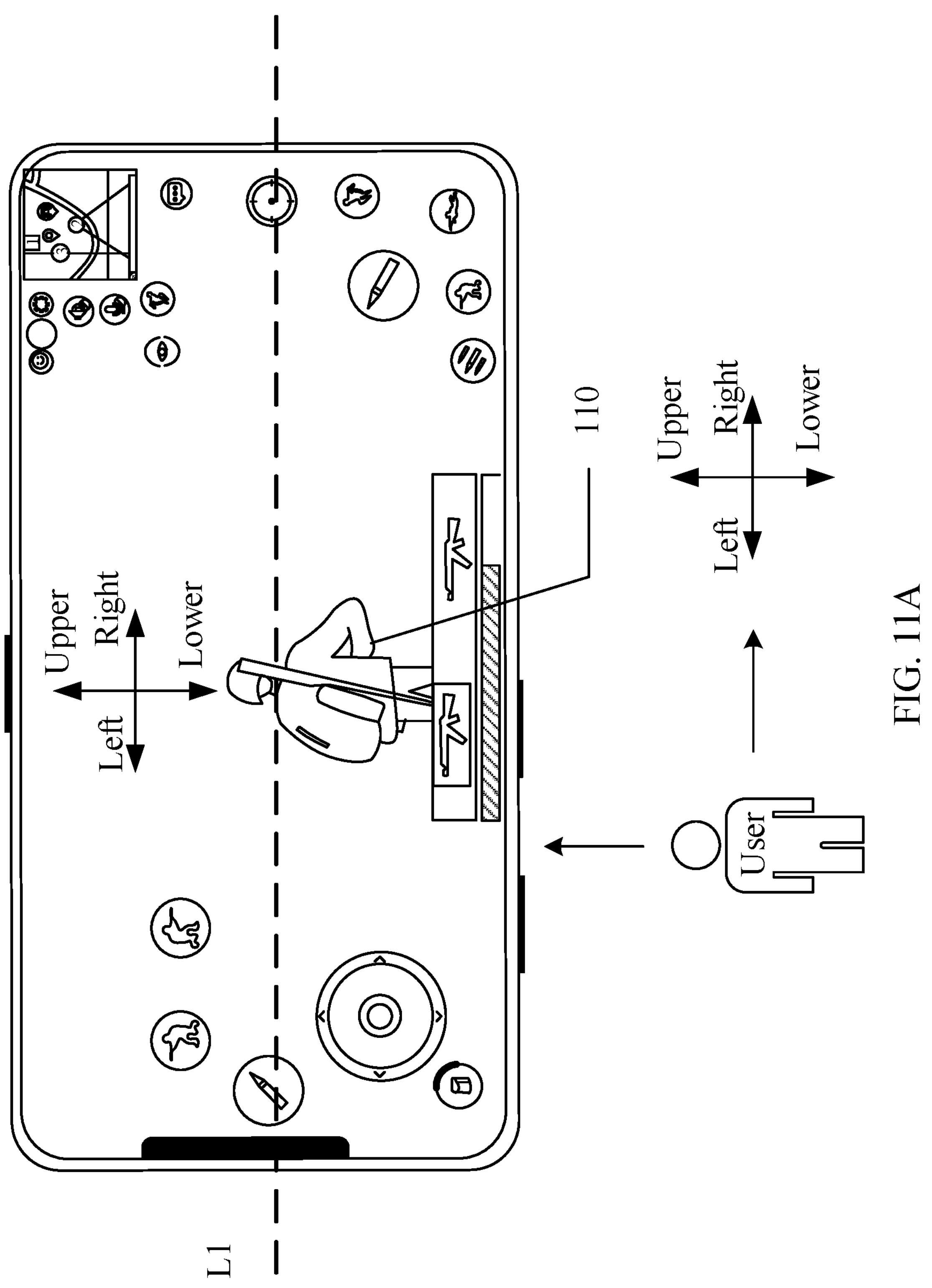
FIG. 11A is a schematic diagram of a virtual object direction in a third personal perspective provided by an embodiment of this application.

As an example, refer to FIG. 11A, which is a schematic diagram of a virtual object direction in a third personal perspective provided by an embodiment of this application. In FIG. 11A, the user directly faces the human-computer interaction interface, and the left direction and the right direction perceived by the user are shown as a reference axis in FIG. 11A. In FIG. 11A, a lens of the virtual scene faces the back of the virtual object 110. The direction corresponding to the virtual object is as shown in the reference axis above the virtual object 110. In this case, the left direction of the virtual object is the same as the left direction perceived by the user, and the right direction of the virtual object is the same as the right direction perceived by the user.

Figure 11B:
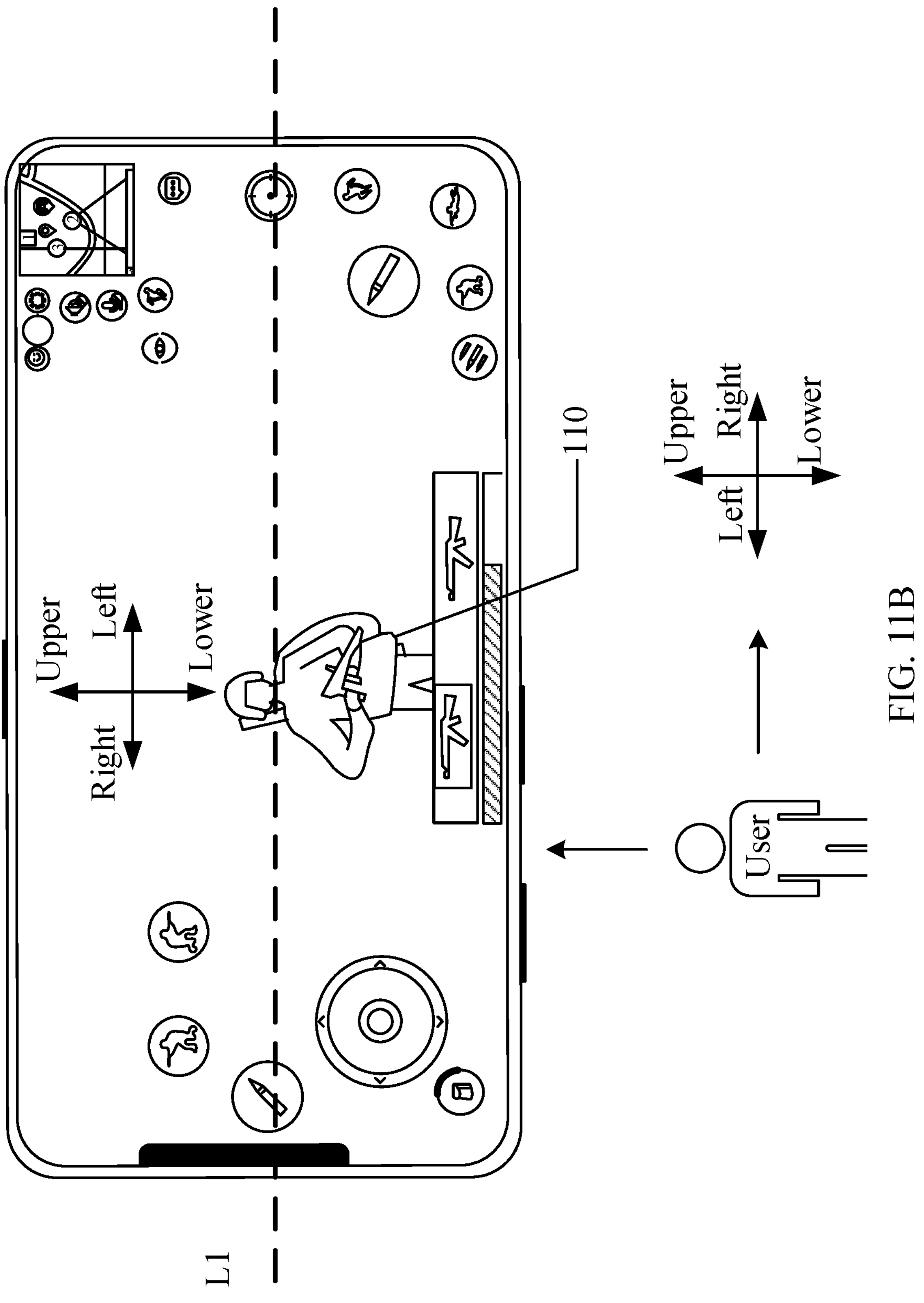
FIG. 11B is a schematic diagram of a virtual object direction in a third personal perspective provided by an embodiment of this application.

As an example, refer to FIG. 11B, which is a schematic diagram of a virtual object direction in a third personal perspective provided by an embodiment of this application. The user in FIG. 11B directly faces the human-computer interaction interface, and the left direction and the right direction perceived by the user are shown as a reference axis in FIG. 11B. In FIG. 11B, the lens of the virtual scene faces the front of the virtual object 110. The direction corresponding to the virtual object is as shown in the reference axis above the virtual object 110. In this case, the left direction of the virtual object is opposite to the left direction perceived by the user, and the right direction of the virtual object is also opposite to the right direction perceived by the user.

As previously described, the electronic device and the terminal device may be the same device. The terminal device may be a mobile terminal with a gyroscope arranged internally (for example: a smartphone, a tablet computer, a hand-held game terminal, an augmented reality device). The electronic device and the terminal device may also be different devices, which are described in combination with different scenes.

In some embodiments, the electronic device and the terminal device may be the same device. The terminal device may be a mobile terminal with a gyroscope arranged internally (for example: a smartphone, a tablet computer, a hand-held game terminal, an augmented reality device). The terminal device identifies a first rotation operation relying on data sensed by the gyroscope, so as to control the posture of the virtual object in response to the first rotation operation.

Before the terminal device receives the first rotation operation, the virtual object is in an initial state. In order to facilitate explanation and description, the initial posture of the virtual object being an upright standing posture is taken as an example for describing in the embodiment of this application. Refer to FIG. 9C, which is a schematic diagram of displaying a virtual scene in a human-computer interaction interface provided by an embodiment of this application. In FIG. 9C, L1 is a straight line parallel to a width direction of the human-computer interaction interface. The lens of the virtual scene faces the back of the virtual object. A current posture of the virtual object 110 is an upright standing posture. The upright standing posture in FIG. 9C is taken as a reference object for subsequent explanation and description of the embodiment of this application.

Figure 9A:
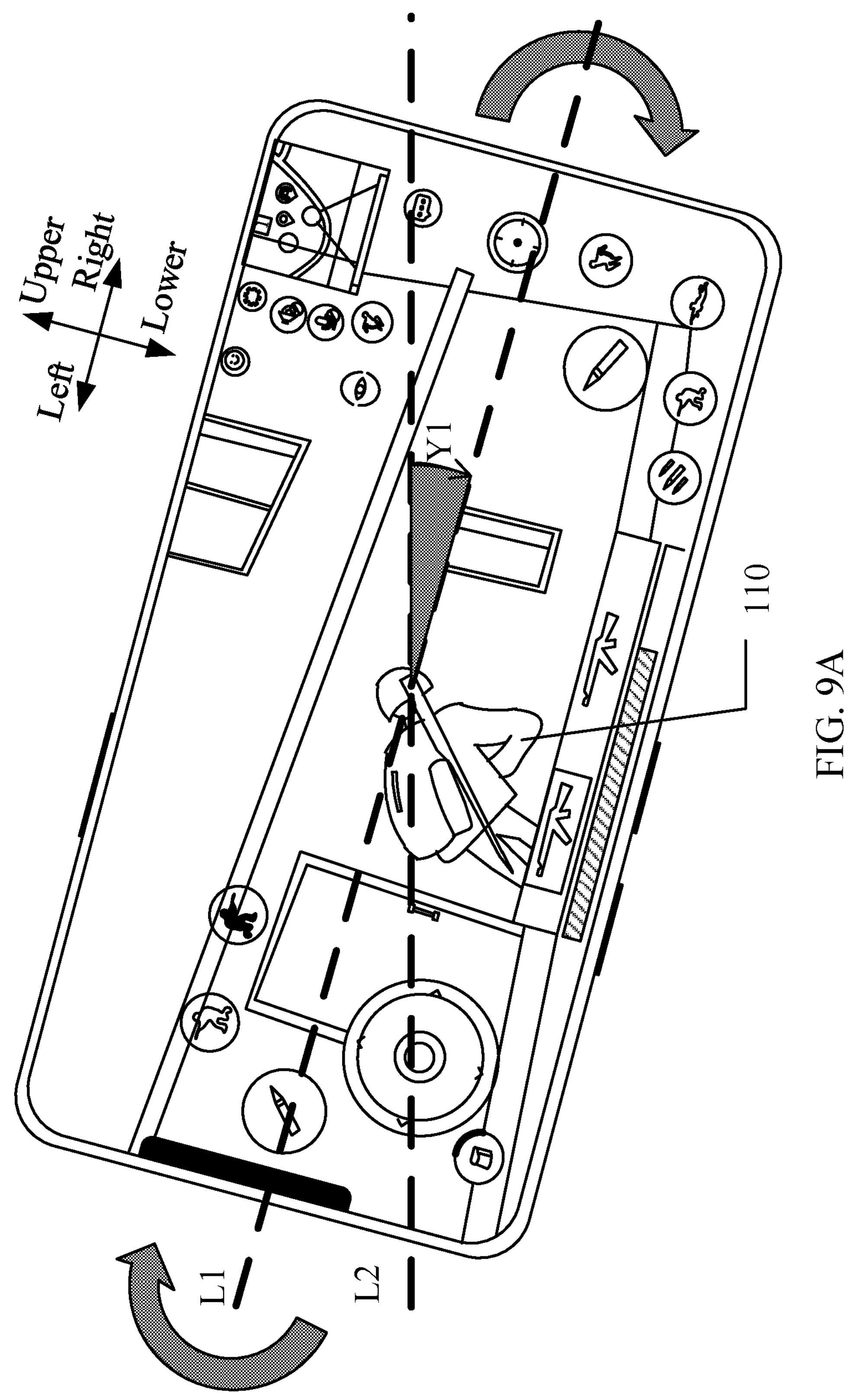
FIG. 9A is a schematic diagram of displaying a virtual scene in a human-computer interaction interface provided by an embodiment of this application.

When the terminal device receives the first rotation operation, if the first rotation operation is a clockwise rotation around a YAW axis, refer to FIG. 9A, which is a schematic diagram of displaying a virtual scene in a human-computer interaction interface provided by an embodiment of this application. In FIG. 9A, the terminal device rotates clockwise around the YAW axis. The position of a straight line L2 is a position where the straight line L1 is located before the first rotation operation is performed. An included angle Y1 formed by the straight line L1 and the straight line L2 is an angle of that the first rotation operation rotates around the YAW axis. The virtual object 110 is controlled to tilt to the right direction of the posture of the virtual object according to the first rotation operation. Compared with the upright standing posture in FIG. 9C, the posture of the virtual object 110 in FIG. 9A is a rightwards tilt posture.

Figure 9B:
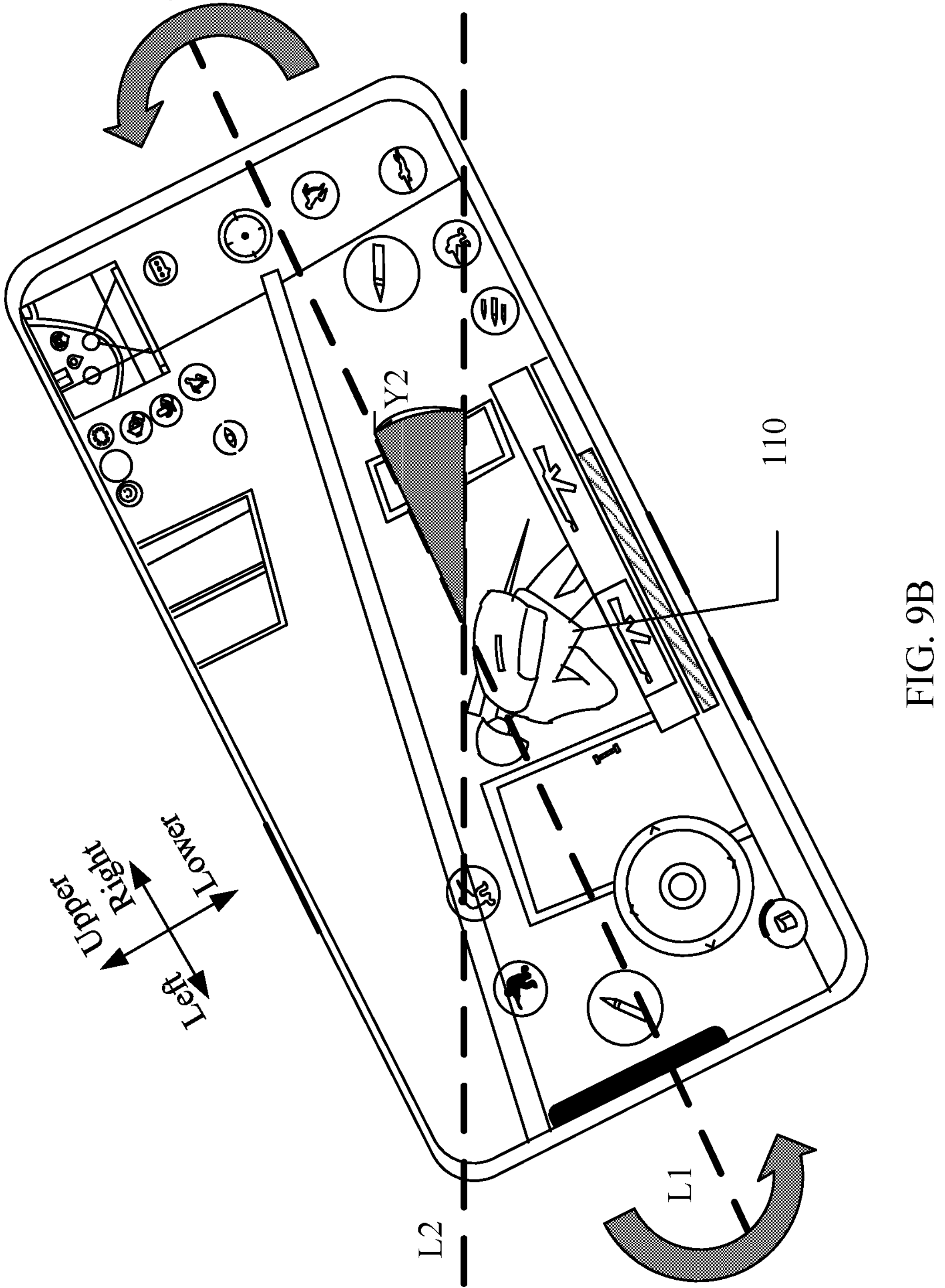
FIG. 9B is a schematic diagram of displaying a virtual scene in a human-computer interaction interface provided by an embodiment of this application.
Figure 9C:
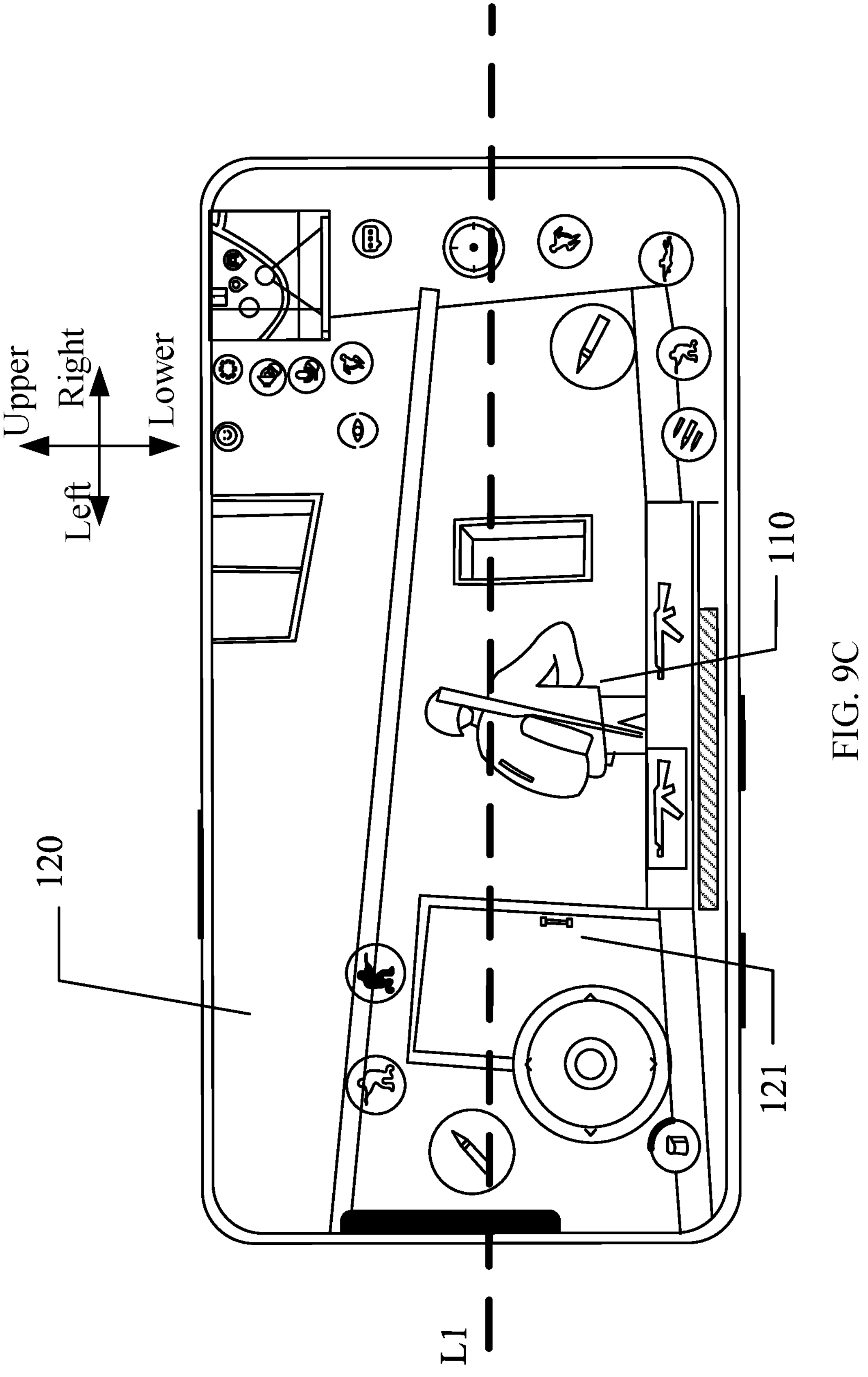
FIG. 9C is a schematic diagram of displaying a virtual scene in a human-computer interaction interface provided by an embodiment of this application.

When the terminal device receives the first rotation operation, if the first rotation operation is an anticlockwise rotation around the YAW axis, refer to FIG. 9B, which is a schematic diagram of displaying a virtual scene in a human-computer interaction interface provided by an embodiment of this application. In FIG. 9B, the terminal device rotates anticlockwise around the YAW axis. The position of a straight line L2 is a position where the straight line L1 is located before the first rotation operation is performed. An included angle Y2 formed by the straight line L1 and the straight line L2 is an angle of rotation of the first rotation operation rotates around the YAW axis. The virtual object 110 is controlled to tilt to the left direction of the posture of the virtual object according to the first rotation operation. Compared with the upright standing posture in FIG. 9C, the posture of the virtual object 110 in FIG. 9A is a leftwards tilt posture.

In some embodiments, the electronic device and the terminal device may be different devices. The electronic device may be a handle device with a gyroscope arranged internally (for example: a wired handle device, a wireless handle device, and a wireless remote controller). In response to the first rotation operation for the handle device, the handle device generates a corresponding angular motion signal based on the first rotation operation and transmits the angular motion signal to the terminal device. The terminal device controls, according to the angular motion signal, the posture of the virtual object to tilt.

The electronic device may also be a wearable device with a gyroscope arranged internally (for example: an earphone, a helmet, and a smart bracelet). In response to the first rotation operation for the wearable device, the handle device generates a corresponding angular motion signal based on the first rotation operation, and transmits the angular motion signal to the terminal device. The terminal device controls, according to the angular motion signal, the posture of the virtual object to tilt.

According to the embodiment of this application, a virtual posture of the virtual object is controlled, through a tilt operation, to tilt in a direction corresponding to the tilt operation, which improves the efficiency of controlling the virtual object in a virtual scene. Compared with a mode of controlling the posture of the virtual object through virtual keys, a user may controls the virtual object to perform a plurality of combined postures through fewer pressing operations (for example: shooting and titling an upper body), the control difficulty is reduced, the space for setting the virtual keys on the human-computer interaction interface is reduced, the computing resources required for displaying the virtual keys on the human-computer interaction interface are reduced, and the obstruction of the human-computer interaction interface is reduced.

In step 103, the lens of the virtual scene is controlled to rotate around the second rotation reference axis in response to a second rotation operation, Here, the second rotation reference axis is parallel to a width direction of the human-computer interaction interface.

Exemplarily, the lens of the virtual scene is located in the space of the virtual scene. A picture of the virtual scene displayed on the human-computer interaction interface of the terminal device is obtained by shooting the content of the virtual scene by the lens of the virtual scene.

Here, the second rotation operation is a rotation operation of the electronic device around the second rotation reference axis (the ROLL axis). The lens of the virtual scene rotates around the direction consistent with the second rotation reference axis according to the second rotation operation. A rotation angle of the lens of the virtual scene is in positive correlation with the angle of rotation of the second rotation operation around the second rotation reference axis.

As an example, a rotation angle of the lens of the virtual scene and the angle of the second rotation operation around the second rotation reference axis are constrained by a direct proportional function, or a curve function of an upward trend.

The second rotation operation is a rotation operation for the electronic device around the second rotation reference axis. An implementation object of the above second rotation operation is the electronic device. The electronic device and the terminal device that performs various steps in FIG. 1A and FIG. 1B may be the same device. At this moment, the terminal device may be a mobile terminal with a gyroscope arranged internally (for example: a smartphone, a tablet computer, a hand-held game terminal, an augmented reality device). The electronic device and the terminal device may also be different devices, which are described in combination with different scenes.

In some embodiments, the terminal device controls the lens of the virtual scene for the second rotation operation that controls the terminal device to rotate. Refer to FIG. 9C, which is a schematic diagram of displaying a virtual scene in a human-computer interaction interface before the terminal device receives the second rotation operation.

For example: the second rotation operation is an anticlockwise rotation of a terminal device around the second rotation reference axis. A lens of the virtual scene rotates anticlockwise around the second rotation reference axis. Rotation directions are consistent and rotation angles are in positive correlation with each other. The lens of the virtual scene rotates to a downward direction corresponding to the space of the virtual scene. The human-computer interaction interface displays that a picture of the virtual scene moves from a lower boundary to an upper boundary of the human-computer interaction interface to display a new picture, and the picture stops moving at the end of the second rotation operation.

The positive correlation refers to that the rotation angle of the lens of the virtual scene is in direct proportion with the rotation angle of the second rotation operation, or the change trends between the rotation angle of the lens of the virtual scene and the rotation angle of the second rotation operation are the same. For example: the rotation angle of the second rotation operation increases, and the rotation angle of the lens of the virtual scene increases.

Figure 6A:
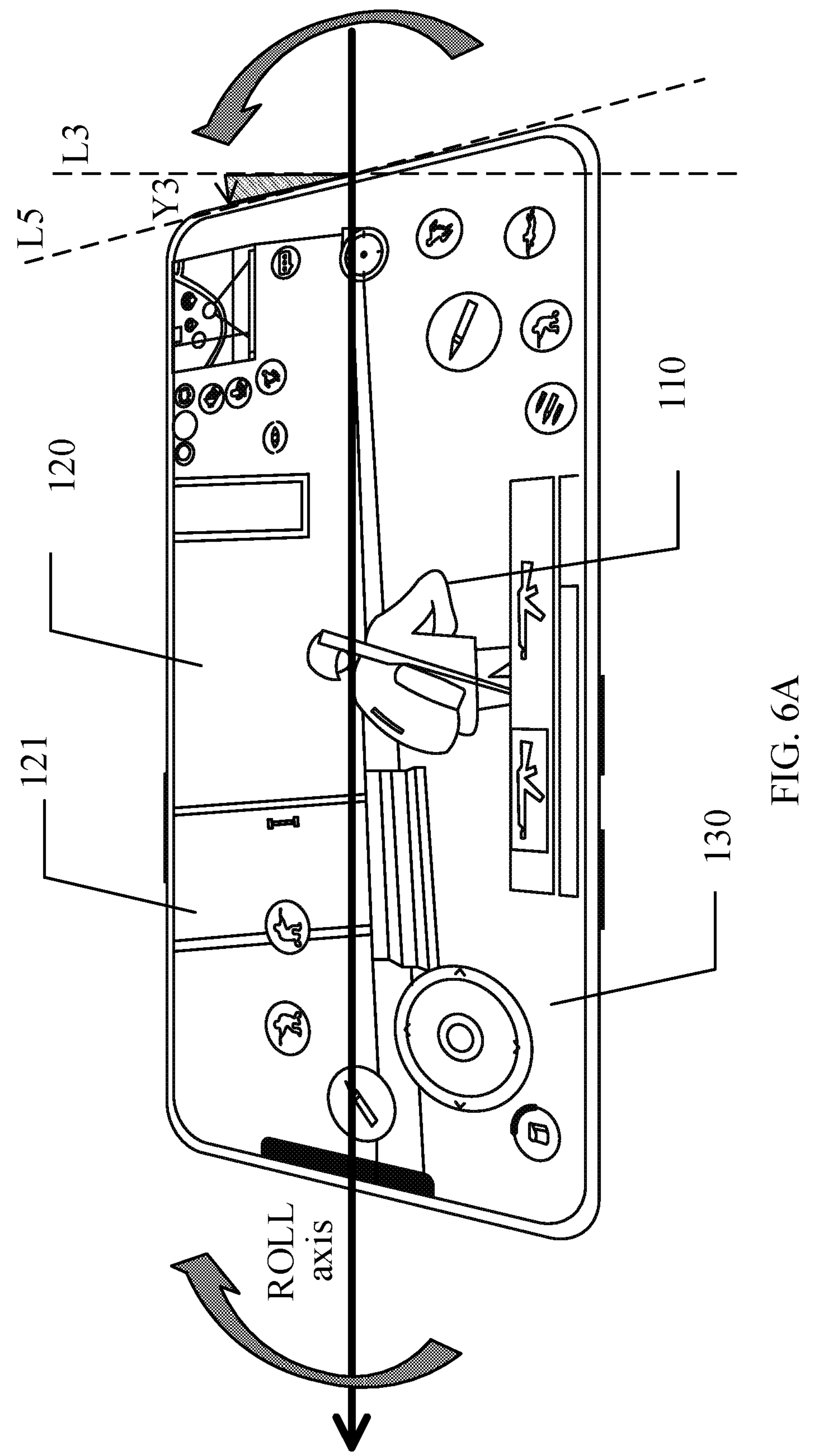
FIG. 6A is a schematic diagram of displaying a virtual scene in a human-computer interaction interface provided by an embodiment of this application.

Refer to FIG. 6A, which is a schematic diagram of displaying a virtual scene in a human-computer interaction interface provided by an embodiment of this application. In the embodiment of this application, a reference object being a virtual building 120 is taken as an example for description. The virtual buildings 120 below are the same virtual building. The virtual building 120 is a two-story building. In FIG. 6A, only part of the virtual building 120 is displayed. With the change of the lens direction of the virtual scene, the picture displayed by the human-computer interaction interface of the terminal device can display different parts of the virtual building 120. When the lens of the virtual scene is mounted at a head position of the virtual object, and the plane corresponding to the lens of the virtual scene is perpendicular to the vertical direction in the space of the virtual scene, refer to FIG. 9C, the virtual scene displayed in the human-computer interaction interface includes: the virtual object 110 and the first floor of the virtual building 120, and the first floor of the virtual building 120 includes: a door 121 of a complete virtual building.

Refer to FIG. 6A, the terminal device rotates anticlockwise around the second rotation reference axis (the ROLL axis in FIG. 6A). The position of a straight line L3 is a position where a boundary line L5 on one side of the human-computer interaction interface is located before the second rotation operation is performed. A rotation angle Y3 corresponding to the second rotation operation is an included angle between the boundary line L5 and the straight line L3. An angle that the lens of the virtual scene rotates to the downward direction corresponding to the space of the virtual scene along with the second rotation operation is in positive correlation with the rotation angle Y3. The virtual object 110, part of the virtual building 120, part of the door 121 of the virtual building, and a virtual scene ground 130 are displayed in the human-computer interaction interface. Compared with FIG. 9C, an upper boundary of the door 121 of the virtual building in the picture displayed in the human-computer interaction interface of the terminal device in FIG. 6A is invisible, and the virtual scene ground 130 newly appears.

Continue to refer to FIG. 9C, which is a schematic diagram of displaying a virtual scene in a human-computer interaction interface before receiving the second rotation operation. For another example, the second rotation operation is a clockwise rotation of a terminal device around a second rotation reference axis. A lens of the virtual scene rotates clockwise around the second rotation reference axis. Rotation directions are consistent and rotation angles are in positive correlation with each other. The lens of the virtual scene rotates to an upward direction corresponding to the space of the virtual scene. The human-computer interaction interface displays that a picture of the virtual scene moves from an upper boundary to a lower boundary of the human-computer interaction interface to display a new picture, and the picture stops moving at the end of the second rotation operation.

Figure 6B:
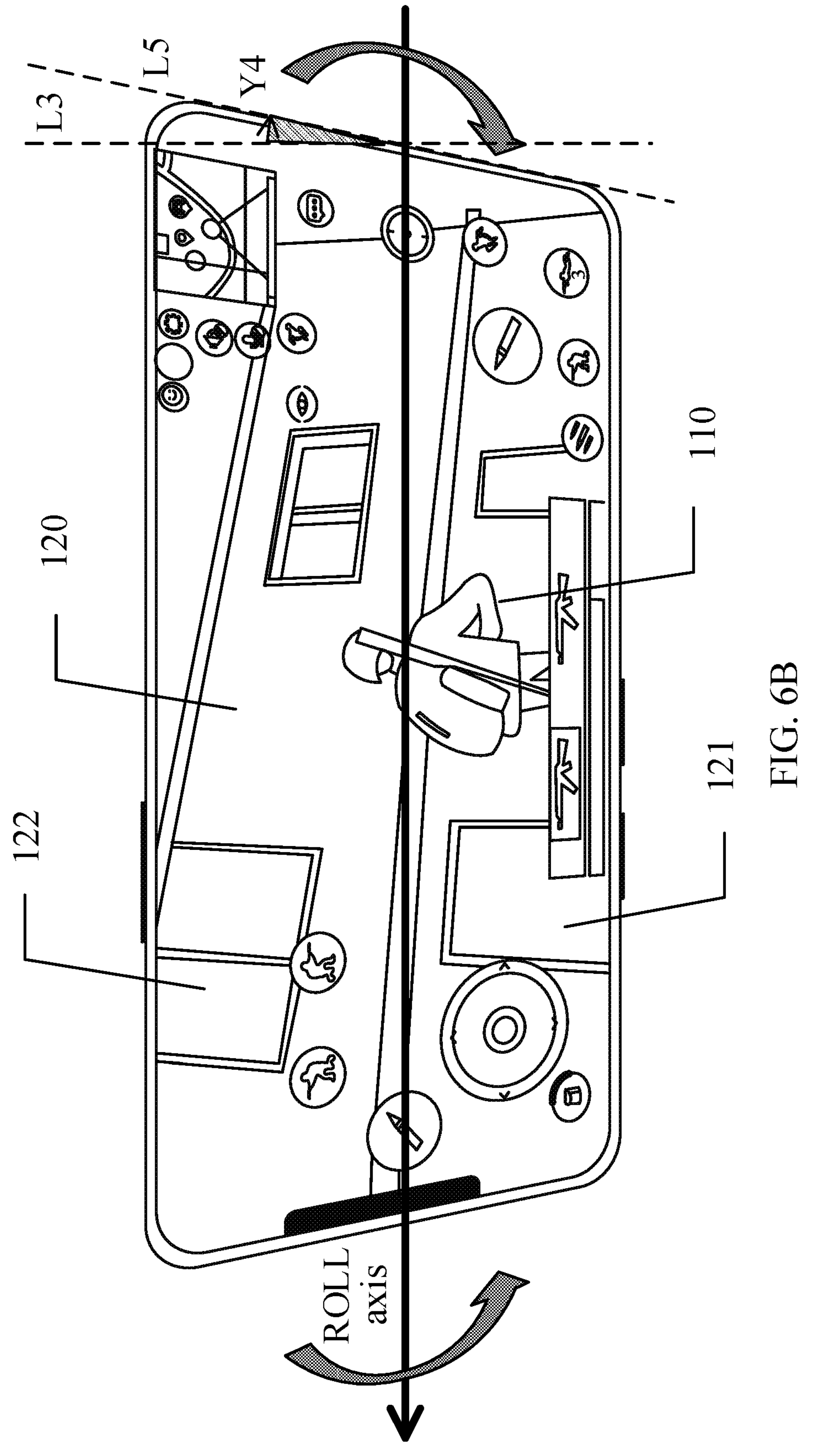
FIG. 6B is a schematic diagram of displaying a virtual scene in a human-computer interaction interface provided by an embodiment of this application.

Refer to FIG. 6B, which is a schematic diagram of a human-computer interaction interface in a virtual scene provided by an embodiment of this application. The terminal device rotates clockwise around the second rotation reference axis (the ROLL axis in FIG. 6B). The position of a straight line L3 is a position where a boundary line L5 on one side of the human-computer interaction interface is located before the second rotation operation is performed. A rotation angle Y4 corresponding to the second rotation operation is an included angle between the boundary line L5 and the straight line L3. Referring to FIG. 6B, it can be known that an angle that the lens of the virtual scene rotates to the upward direction corresponding to the space of the virtual scene along with the second rotation operation is in positive correlation with the rotation angle Y4. The virtual object 110, the first floor and the second floor of the virtual building 120, and part of the door 121 of the virtual building are displayed in the human-computer interaction interface. Compared with FIG. 9C, a lower boundary of the door 121 of the virtual building in the picture displayed in the human-computer interaction interface of the terminal device in FIG. 6B is invisible, and a window 122 of the second floor of the virtual building newly appears.

In some embodiments, the electronic device and the terminal device may be different devices. The electronic device may be a handle device with a gyroscope arranged internally (for example: a wired handle device, a wireless handle device, and a wireless remote controller). That is, the handle device generates a corresponding angular motion signal for the second rotation operation that controls the handle device to rotate and transmits the angular motion signal to the terminal device. The terminal device controls, according to the angular motion signal, the lens of the virtual scene to rotate. The electronic device may also be a wearable device with a gyroscope arranged internally (for example: an earphone, a helmet, and a smart bracelet). That is, the wearable device generates a corresponding angular motion signal for the second rotation operation that controls the wearable device to rotate and transmits the angular motion signal to the terminal device. The terminal device controls, according to the angular motion signal, the lens of the virtual scene to rotate.

According to the embodiment of this application, the lens of the virtual scene is controlled, through a tilt operation, to tilt along with the direction corresponding to the tilt operation, which improves the efficiency of controlling the lens of the virtual scene. The lens is controlled to rotate through the tilt operation, which facilitates displaying pictures from different perspectives in the virtual scene to a user. Compared with controlling the lens through virtual keys, the control difficulty is reduced, the space for setting the virtual keys on the human-computer interaction interface is reduced, the computing resources required for displaying the virtual keys on the human-computer interaction interface are reduced, and the obstruction of the human-computer interaction interface is reduced.

In step 104, the lens of the virtual scene is controlled to rotate around the third rotation reference axis in response to a third rotation operation for the electronic device.

Exemplarily, the electronic device is a terminal device, and the third rotation reference axis is parallel to a length direction of the human-computer interaction interface of the terminal device.

Here, the third rotation operation is a rotation operation of the terminal device around the third rotation reference axis (the PITCH axis). The lens of the virtual scene rotates around the direction consistent with the third rotation reference axis according to the third rotation operation. A rotation angle of the lens of the virtual scene is in positive correlation with the angle of rotation of the third rotation operation around the third rotation reference axis.

As an example, a rotation angle of the lens of the virtual scene and the angle of the third rotation operation around the third rotation reference axis are constrained by a direct proportional function, or a curve function of an upward trend.

Here, the third rotation operation is a rotation operation for the electronic device around the third rotation reference axis. An implementation object of the above third rotation operation is the electronic device. The electronic device and the terminal device that performs various steps in FIG. 1A and FIG. 1B may be the same device. At this moment, the terminal device may be a mobile terminal with a gyroscope arranged internally (for example: a smartphone, a tablet computer, a hand-held game terminal, an augmented reality device). The electronic device and the terminal device may also be different devices, which are described in combination with different scenes.

In some embodiments, that is, the terminal device controls the lens of the virtual scene for the third rotation operation that controls the terminal device to rotate. Refer to FIG. 9C, which is a schematic diagram of displaying a virtual scene in a human-computer interaction interface before the terminal device receives the third rotation operation. For example: the third rotation operation is an anticlockwise rotation of a terminal device around the third rotation reference axis, and then a lens of the virtual scene rotates anticlockwise around the third rotation reference axis. Rotation directions are consistent and rotation angles are in positive correlation with each other. The lens of the virtual scene rotates to a left direction perceived by a user facing the human-computer interaction interface in the virtual scene. The human-computer interaction interface displays that a picture of the virtual scene moves from a left boundary to a right boundary of the human-computer interaction interface to display a new picture, and the picture stops moving at the end of the third rotation operation.

Here, the directions of the right boundary and the left boundary of the human-computer interaction interface are determined by the left and right directions perceived by the user facing the human-computer interaction interface.

Figure 7A:
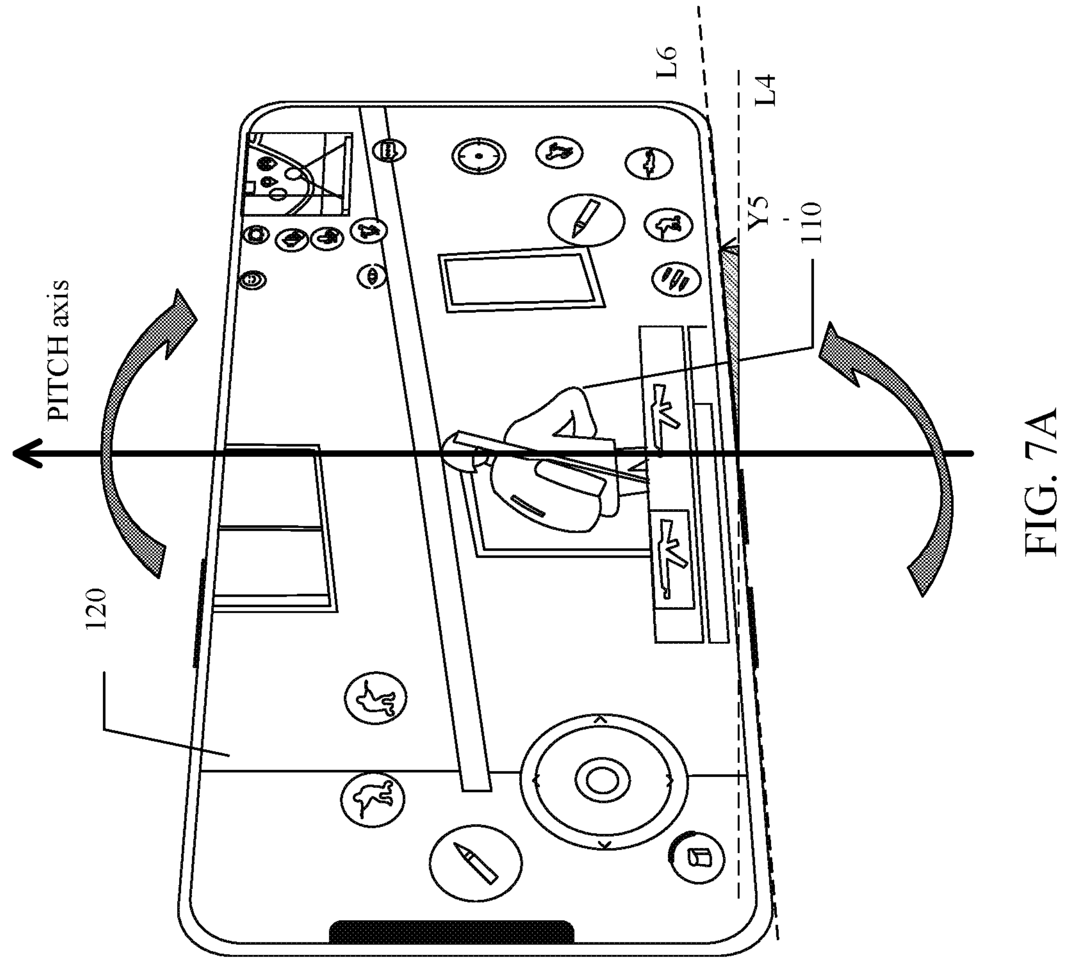
FIG. 7A is a schematic diagram of displaying a virtual scene in a human-computer interaction interface provided by an embodiment of this application.

Refer to FIG. 7A, which is a schematic diagram of displaying a virtual scene in a human-computer interaction interface provided by an embodiment of this application. The electronic device rotates anticlockwise around the second rotation reference axis (the PITCH axis in FIG. 7A). The position of a straight line L4 is a position where a boundary line L6 on one side of the human-computer interaction interface is located before the third rotation operation is performed. A rotation angle Y5 corresponding to the third rotation operation is an included angle between the boundary line L6 and the straight line L4. An angle that the lens of the virtual scene rotates in the left direction perceived by the user facing the human-computer interaction interface in the virtual scene along with the third rotation operation is in positive correlation with the rotation angle Y5. The human-computer interaction interface displays the virtual object 110, and part of the virtual building 120. Compared with FIG. 9C, a left boundary of the virtual building 120 newly appears in the picture displayed by the human-computer interaction interface in FIG. 7A. The left is perceived by the user facing the human-computer interaction interface.

Continue to refer to FIG. 9C, which is a picture of the human-computer interaction interface before the rotation operation. For another example: the third rotation operation is a clockwise rotation of a terminal device around the third rotation reference axis, and then a lens of the virtual scene rotates clockwise around the third rotation reference axis. Rotation directions are consistent and rotation angles are in positive correlation with each other. The lens of the virtual scene rotates to a right direction perceived by a user facing the human-computer interaction interface in the virtual scene. The human-computer interaction interface displays that a picture of the virtual scene moves from a right boundary to a left boundary of the human-computer interaction interface to display a new picture, and the picture stops moving at the end of the third rotation operation.

Figure 7B:
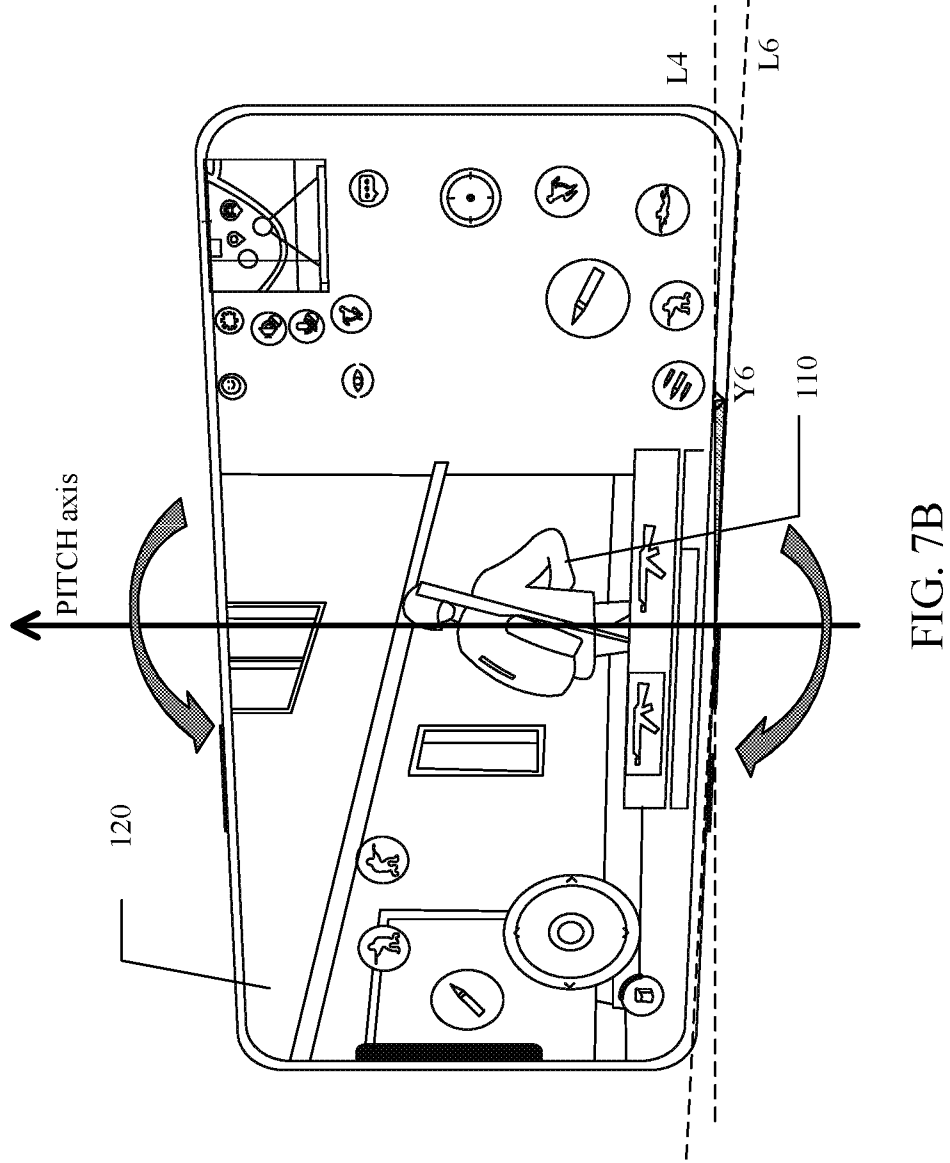
FIG. 7B is a schematic diagram of displaying a virtual scene in a human-computer interaction interface provided by an embodiment of this application.

Refer to FIG. 7B, which is a schematic diagram of displaying a virtual scene in a human-computer interaction interface provided by an embodiment of this application. The electronic device rotates clockwise around the third rotation reference axis (the PITCH axis in FIG. 7B). The position of a straight line L4 is a position where a boundary line L6 on one side of the human-computer interaction interface is located before the third rotation operation is performed. A rotation angle Y6 corresponding to the third rotation operation is an included angle between the boundary line L6 and the straight line L4. An angle that the lens of the virtual scene rotates in the right direction perceived by the user facing the human-computer interaction interface in the virtual scene along with the third rotation operation is in positive correlation with the rotation angle Y6. The human-computer interaction interface displays the virtual object 110, and part of the virtual building 120. Compared with FIG. 9C, a left boundary of the virtual building 120 newly appears in the picture displayed by the human-computer interaction interface in FIG. 7B. The right is perceived by the user facing the human-computer interaction interface.

In some embodiments, the electronic device and the terminal device may be different devices. The electronic device may be a handle device with a gyroscope arranged internally (for example: a wired handle device, a wireless handle device, and a wireless remote controller). That is, the handle device generates a corresponding angular motion signal for the third rotation operation that controls the handle device to rotate and transmits the angular motion signal to the terminal device. The terminal device controls, according to the angular motion signal, the lens of the virtual scene to rotate. The electronic device may also be a wearable device with a gyroscope arranged internally (for example: an earphone, a helmet, and a smart bracelet). That is, the wearable device generates a corresponding angular motion signal for the third rotation operation that controls the wearable device to rotate and transmits the angular motion signal to the terminal device. The terminal device controls, according to the angular motion signal, the lens of the virtual scene to rotate.

Refer to FIG. 3A, step 102, step 103, and step 104 may be performed after step 101. There is no performing order restriction among step 101, step 103, and step 104, and corresponding steps may be performed when rotation operation corresponding to the steps are received. After performing the aforementioned steps, the terminal device displays the virtual scene in a viewing perspective corresponding to the tilted posture of the virtual object. In some embodiments, the titled perspective corresponds to a position of the head of the virtual object.

Here, the rotation reference axes around which the first rotation operation, the second rotation operation, and the third rotation operation rotate are not the same. The three operations do not interfere with each other, and the three operations may be performed simultaneously or only one or two of them are performed. The first rotation operation corresponds to the control of the posture of the virtual object, the second rotation operation corresponds to the rotation of the lens around the second rotation reference axis, and the third rotation operation corresponds to the rotation of the lens around the third rotation reference axis. Since the rotation reference axes corresponding to various operations are different, the rotation directions of the lens are not different, and there is no conflict between posture adjustment and lens adjustment, controls corresponding to the three operations can be performed simultaneously.

In some embodiments, refer to FIG. 3B, which is a schematic flowchart of an object control method in a virtual scene provided by an embodiment of this application. Each step in FIG. 3B and each step in FIG. 3A have the same content. Exemplarily, in FIG. 3B, after step 101, step 102, step 103, and step 104 are performed in sequence.

Figure 3C:
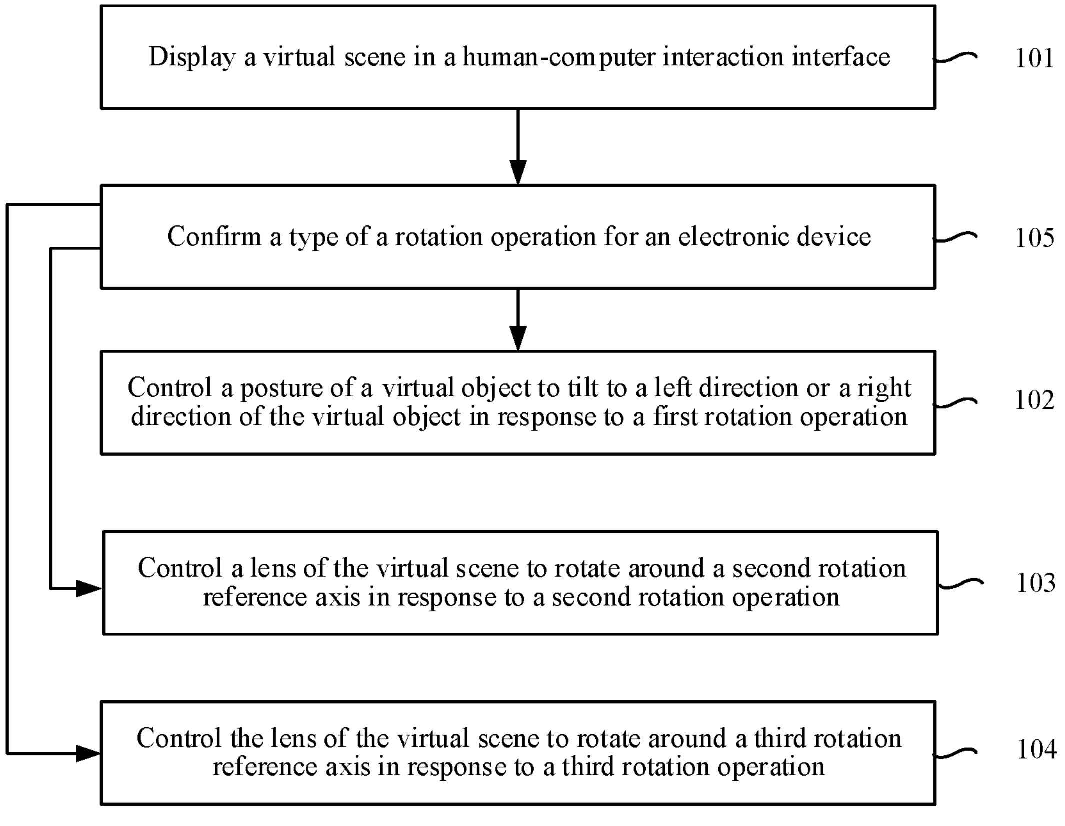
FIG. 3C is a schematic flowchart of an object control method in a virtual scene provided by an embodiment of this application.

In some embodiments, refer to FIG. 3C, which is a schematic flowchart of an object control method in a virtual scene provided by an embodiment of this application. After step S101, the method further includes the following steps: Step 105: Confirm a type of a rotation operation for an electronic device. The type of the rotation operation includes: a first rotation operation, a second rotation operation, and a third rotation operation. In step 105 of confirming the type of the rotation operation, a confirmed result may be: any two of the three rotation operations are performed; any one of the three rotation operations is performed; and the three rotation operations are performed simultaneously. After confirming the current rotation operations, steps corresponding to each rotation operation are performed respectively. The type of the currently performed rotation operation can be confirmed effectively by performing step 105, so as to reserve processing time for the electronic device. For example: in step 105, the rotation operation performed currently for the electronic device is confirmed as the first rotation operation and the third rotation operation. Referring to FIG. 3C, step 102 and step 104 are performed after step 105; and since the second rotation operation is not performed, and step 103 does not respond and is not performed. By combining the first rotation operation and the third rotation operation, the posture of the virtual object may be controlled to tilt to the left direction or the right direction when the lens rotates around the third rotation reference axis. If the first rotation reference axis is corresponding to tilting to the left direction or the right direction of the virtual object, and the third rotation reference axis is corresponding to rotating anticlockwise around the third rotation reference axis, the human-computer interaction interface displays that the picture of the virtual scene moves to the left side of the virtual object, and the posture of the virtual object tilts to the left.

In some embodiments, step 102 may be implemented in the following mode: controlling, according to a direction consistent with the rotation of the first rotation operation around first rotation reference axis, at least part including the head of the virtual object to tilt to the left direction or the right direction of the virtual object. As an example, tilt angles of various downward parts of the head of the virtual object decrease in sequence, and all are in positive correlation with an angle of the rotation of the first rotation operation around the first rotation reference axis.

As an example, a motion model of the virtual object includes the head, the neck, the limbs, and the torso. At least part including the head may be the head, the neck, the upper limbs, the waist, and the torso part above the waist of the virtual object. Or, at least part including the head may be the head, the neck, the upper limbs, the shoulder, and the chest of the virtual object. For ease of explanation, the posture of the virtual object before tilting is taken as a first posture, and the posture after tilting is taken as a second posture. The first posture may be the posture where the center of gravity of the head and the center of gravity of the torso are in the same line, for example: a standing posture or a squatting posture; the second posture may be the posture where the center of gravity of the head and the center of gravity of the torso are not in the same line, for example: a posture of poking the head out leftwards or a posture of poking the head out rightwards. The posture of the virtual object is controlled to tilt, which may be characterized as: The posture of the virtual object is switched from the first posture to the second posture. The second posture is taken as a new first posture after the posture of the virtual object is tilted.

Figures 4A, 4B:
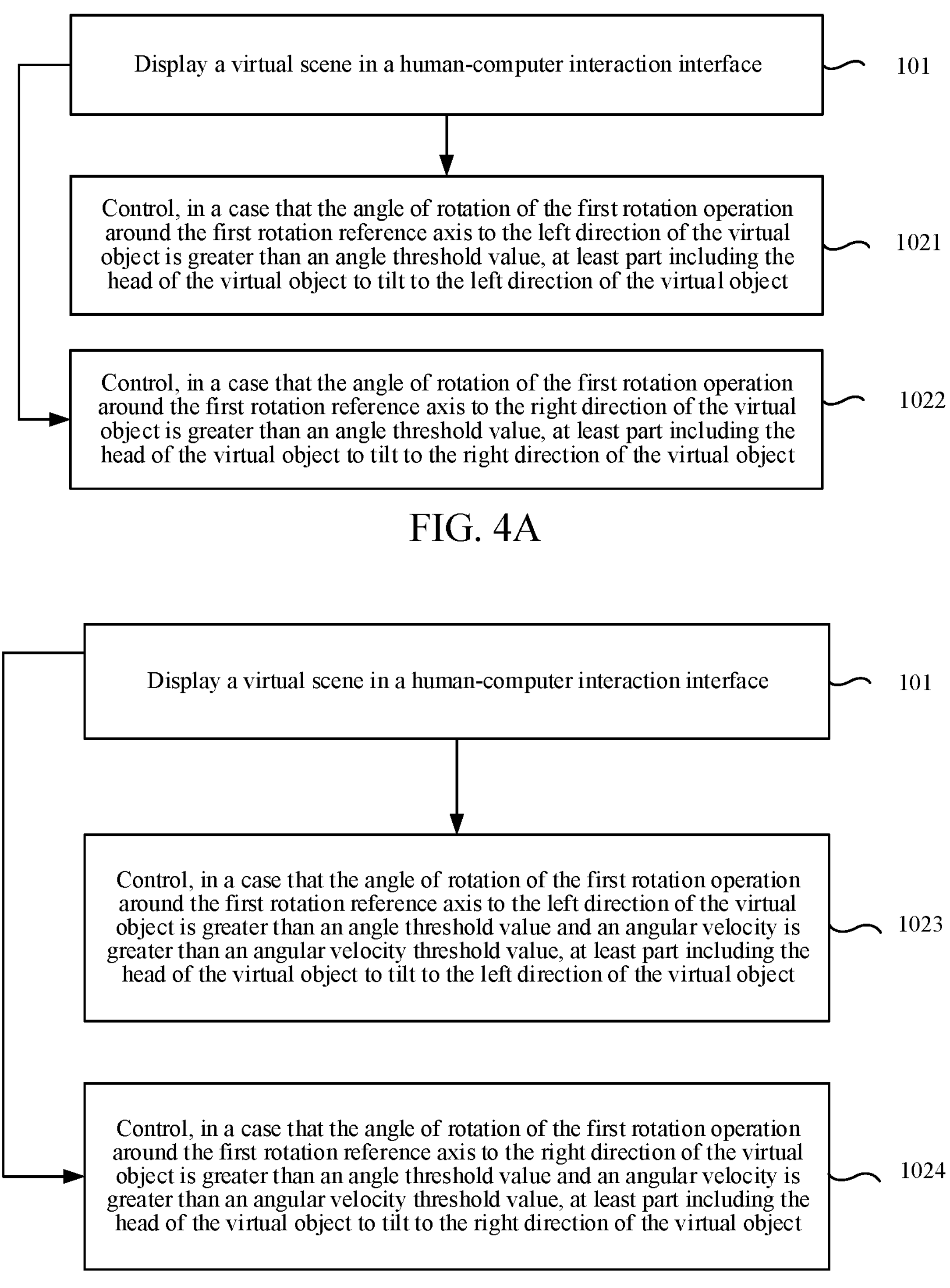
FIG. 4A is a schematic flowchart of an object control method in a virtual scene provided by an embodiment of this application.
FIG. 4B is a schematic flowchart of an object control method in a virtual scene provided by an embodiment of this application.

In some embodiments, refer to FIG. 4A, which is a schematic flowchart of an object control method in a virtual scene provided by an embodiment of this application. In step 102, the posture of the virtual object is controlled to tilt to the left direction or the right direction of the virtual object in response to the first rotation operation for the electronic device, which may be implemented through step 1021 and step 1022 in FIG. 4A.

In step 1021, when the angle of rotation of the first rotation operation around the first rotation reference axis to the left direction of the virtual object is greater than an angle threshold value, at least part including the head of the virtual object is controlled to tilt to the left direction of the virtual object.

In step 1022, when the angle of rotation of the first rotation operation around the first rotation reference axis to the right direction of the virtual object is greater than an angle threshold value, at least part including the head of the virtual object is controlled to tilt to the right direction of the virtual object.

As an example, in FIG. 4A, a premise for performing the step of controlling the at least part including the head of the virtual object to tilt to the left direction or the right direction of the virtual object is that the angle of rotation of the first rotation operation to the left direction or the right direction of the virtual object is greater than the angle threshold value. The angle threshold value may be a value obtained by training and learning according to a rotation operation record, so as to better determine whether the rotation operation of the user meets the premise of rotating the posture to the left direction or the right rotation. By learning the rotation operation record, the accuracy of controlling the posture of the virtual object to tilt is improved, the human-computer interaction efficiency is improved, the posture switching caused by misoperation is avoided, and the computing resources of the terminal device are reduced.

Exemplarily, the angle threshold value may be obtained in the following modes: acquiring historical record data for the first rotation operation of the electronic device, the historical record data including: a rotation angle of the first rotation operation in a recent preset duration (for example: 7 days); counting the frequency of appearance of different rotation angles, and taking the rotation angle with the highest frequency of appearance as the angle threshold value; or counting each rotation angle, and taking a median of the rotation angles as the angle threshold value.

In some embodiments, refer to FIG. 4B, which is a schematic flowchart of an object control method in a virtual scene provided by an embodiment of this application. In step 102, the posture of the virtual object is controlled to tilt to the left direction or the right direction of the virtual object in response to the first rotation operation for the electronic device, which may be implemented through step 1023 and step 1024 in FIG. 4B.

In step 1023, when the angle of rotation of the first rotation operation around the first rotation reference axis to the left direction of the virtual object is greater than an angle threshold value and an angular velocity is greater than an angular velocity threshold value, at least part including the head of the virtual object is controlled to tilt to the left direction of the virtual object.

In step 1024, when the angle of rotation of the first rotation operation around the first rotation reference axis to the right direction of the virtual object is greater than an angle threshold value, and an angular velocity is greater than an angular velocity threshold value, at least part including the head of the virtual object is controlled to tilt to the right direction of the virtual object.

As an example, in FIG. a premise for performing the step of controlling the at least part including the head of the virtual object to tilt to the left direction or the right direction of the virtual object is that the angle of rotation of the first rotation operation to the left direction or the right direction of the virtual object is greater than the angle threshold value and the angular velocity is greater than the angular velocity threshold value.

In some embodiments, the angle threshold value or the angular velocity threshold value may be a fixed value set in advance, or may also be a value determined according to the historical operation data of the user. For example, acquiring historical record data for the virtual object may be acquiring the historical record data that is in a set time closest to the current time or that is of a closest set quantity of rotation operations as the historical record data because a behavioral habit of the user will change occasionally. The historical record data may include: a rotation direction and a rotation angular velocity corresponding to the rotation operation, and an angle at the beginning of the operation. A threshold value recognition model is invoked based on the historical operation data to obtain the angle threshold value and the angular velocity threshold value that are capable of being used for recognizing an abnormal operation for the virtual object. The threshold value recognition model is trained through a rotation operation data sample and a responsive or non-responsive label marked by the rotation operation data sample. The abnormal operation includes, but is not limited to: a difference between the angular velocity of the rotation operation exceeds the angular velocity that the user can reach and a starting angle of the rotation operation is greater than an angle difference corresponding to a normal operation of the user. The rotation operation data sample may be a set of rotation operation data during a normal operation of a real user corresponding to the virtual object. The rotation angle corresponding to the rotation operation is greater than the angle threshold value, or the rotation angle is greater than the angle threshold value and the rotation angular velocity is greater than the angular velocity threshold value, and the rotation operation satisfies a condition of controlling the posture of the virtual object to tilt, then a label of the rotation operation is marked as responsive, and otherwise, the label of the rotation operation is marked as non-responsive. In the above mode, a model that is close to the habit of the user can be established. The angle threshold value and the angular velocity threshold value that conform to the habit of the user are determined through the model, which improves the response rate of the operation, and meanwhile, prevents the virtual object from being operated by the abnormal operation.

It is to be noted that a threshold recognition model is a machine learning model. The machine learning model may be a neural network model (for example, a convolutional neural network, a deep convolutional neural network, or a fully connected neural network), a decision tree model, a gradient lifting tree, a multilayer perceptron, a support vector machine, and the like. The embodiment of this application does not specifically limit the type of the machine learning model.

In some embodiments, before performing step 102, whether the current posture of the virtual object can be tilted in a corresponding direction may also be confirmed. When the current posture of the virtual object satisfies a first condition, step 102 is performed. The first condition includes: a body part, required to move for tilting based on the current posture, of the virtual object is not in a working state. The body part required for tilting includes: the torso above the waist, and the head, the neck, and the upper limbs of the virtual object, or includes: the head, the neck, the chest, the shoulder, and the upper limbs of the virtual object. In some embodiments, the first condition includes: a body part, required to move for tilting based on the current posture, of the virtual object is in a movable state.

Examples are taken for describing below, for example: the first rotation operation is a leftward rotation of the electronic device around the first rotation reference axis to the virtual object. When the current posture is a posture of poking the head out leftwards, all body parts required for performing the posture of poking the head out leftwards are in the working state; and when the first condition is not satisfied, the current posture cannot perform poking the head out leftwards again, and the posture of poking the head out leftwards is maintained. When the current posture of the virtual object is a posture of poking the head out rightwards, the body parts required for titling the posture leftwards is not in the working state; and when the first condition is satisfied, the posture is tilted to the left of the virtual object. When the current posture is a driving posture, the upper limbs of the virtual object in the driving posture are used for driving and are in the working state; and when the current posture does not satisfy the first condition, the current posture is maintained. When the virtual object is in a running posture or a crouching posture, the body parts required for titling are used for maintaining the current posture in the working state. When the current posture does not satisfy the first condition, the current posture is maintained. The virtual object is in the squatting state, the standing state, and the sitting posture (for example: the virtual object is sitting on a non-driving seat of a virtual vehicle), the current posture is maintained without using the body parts require for tilting; and then, the current posture satisfies the first condition, and the posture of poking the head out leftwards is performed.

In some embodiments, before performing step 102, whether state decay will be caused when the posture of the virtual object is tilted may also be confirmed. When the region around the virtual object satisfies a second condition, step 102 is performed. The second condition includes: there is no factor causing the state decay to the virtual object in region. The region around may be in a specified radius range centered on the virtual object. In specific implementation, the region around may be divided according to actual needs. The embodiment of this application does not limit this. The state decay may be the decay of a hit point or fighting capacity. The factor causing the state decay may also be an enemy virtual object or a virtual prop (for example: a trap or a region damage prop). In some embodiments, the second condition includes: there is no danger to the virtual object in the region.

In some embodiments, in order to improve a gaming experience of the user, when the region around the virtual object does not satisfy the second condition, prompt information is displayed. The prompt information is used for characterizing that there is a risk when the virtual object is in a tilt posture. The prompt information may be displayed in any form of voice, text, graphics, or the like. If the user still wants to perform the tilt posture after receiving a prompt, the first rotation operation may be performed again, and step 102 is performed when the first rotation operation is received again.

Examples are taken for describing below, for example: there is an enemy virtual object is in the region around the virtual object, when the first rotation operation is received, the human-computer interaction interface displays the prompt information and gives prompt voice to remind the user. The user still decides to tilt the posture of the virtual object after receiving a reminder, and performs the first rotation operation again. When the first rotation operation is received again, the posture of the virtual object is tilted in the corresponding direction according to the first rotation operation.

In some embodiments, before performing step 102, a virtual object may be prevented from the problems of clipping and the like in a virtual scene by determining whether the space where the virtual object is located in is enough to perform the tilt posture. When the region around the virtual object satisfies a third condition, step 102 is performed. The third condition includes: there is no obstacle that prevents the virtual object from tilting to the left direction or the right direction in the direction consistent with the rotation of the first rotation operation around the first rotation reference axis in the region. In specific implementation, the region around may be divided according to actual needs. The embodiment of this application does not limit this. The obstacle may be a wall, a tree, a stone, or the like in the virtual scene.

Examples are taken for describing below, for example: a virtual object stands at a corner of a wall of a house in a virtual scene, when receiving a first rotation operation around a first rotation reference axis to the left direction of the virtual object, an obstacle wall is in the left direction of the virtual object, the third condition is not satisfied, the processing of tilting the posture of the virtual object to the left direction is not performed, and the current posture is maintained; and a virtual object stands at the back of a tree in a virtual scene, when receiving a first rotation operation around a first rotation reference axis to the left direction of the virtual object, there is no obstacle in the left direction of the virtual object, the third condition is not satisfied, and the processing of tilting the posture of the virtual object to the left direction is performed.

In some embodiments, before performing step 102, value space corresponding to the first rotation operation is determined to confirm a control mode corresponding to the first rotation operation. The control mode includes: a posture tilt mode and a lens rotating mode.

As an example, the posture tilt mode is a mode of controlling the virtual object to tilt through the first rotation operation. The lens rotating mode is a mode of controlling the lens of the virtual scene to rotate around the first rotation reference axis through the first rotation operation.

In some embodiments, when a value of the angular velocity of the first rotation operation is in value space associated with the posture tilt mode, it is determined to be in the posture tilt mode, and step 102 is performed. The value space associated with the posture tilt mode may be set according to actual needs, or may be acquired according to the historical operation data of the user. The embodiment of this application does not limit this.

In some embodiments, when a value of the angular velocity of the first rotation operation is in value space associated with a lens rotating mode, it is determined to be in the lens rotating mode, and the lens of the virtual scene is controlled to rotate around the first rotation reference axis. The value space associated with the lens rotating mode may be set according to actual needs, or may be acquired according to the historical operation data of the user. The embodiment of this application does not limit this. The first rotation reference axis is perpendicular to the human-computer interaction interface. The embodiment of this application does not limit an actual position where the first rotation reference axis passes through the human-computer interaction interface. The position where the first rotation reference axis passes through the human-computer interaction interface may be at a center position of the human-computer interaction interface, or at a center position of the head of the virtual object.

Examples are taken for describing below, for example: the virtual object is maintained in a standing posture, the value of the angular velocity of the first rotation operation is in the value space associated with the lens rotating mode, the first rotation operation is a clockwise rotation around the first rotation reference axis, the first rotation reference axis passes through the human-computer interaction interface from the head of the virtual object. The lens of the virtual scene rotates clockwise around the first rotation reference axis, and it is displayed that the posture of the virtual object is kept unchanged, the virtual scene and the virtual object synchronously rotate clockwise around the first rotation reference axis, and the rotation angle is in positive correlation with the angle corresponding to the first rotation operation.

Figure 4C:
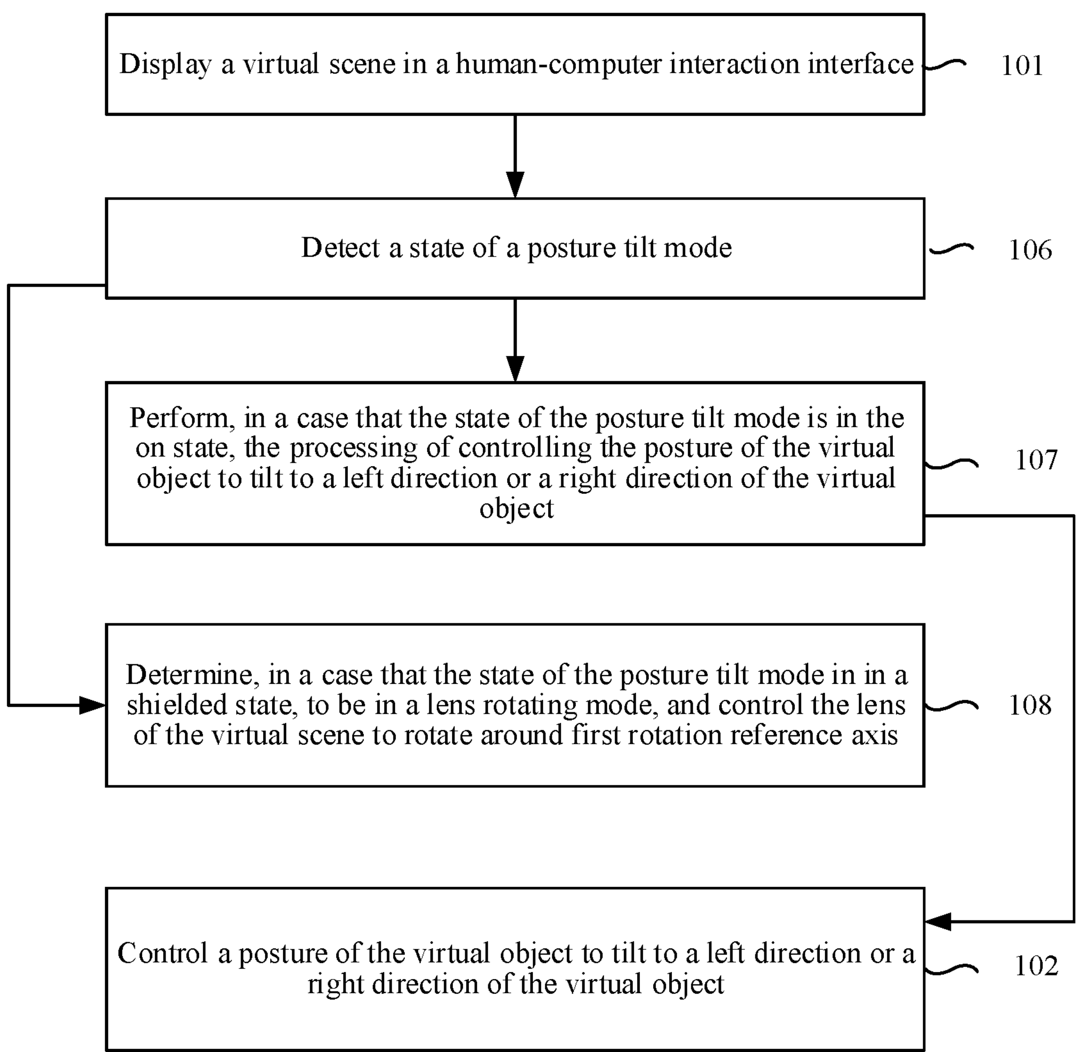
FIG. 4C is a schematic flowchart of an object control method in a virtual scene provided by an embodiment of this application.

Refer to FIG. 4C, which is a schematic flowchart of an object control method in a virtual scene provided by an embodiment of this application. Step 106 may be performed after step 101 in FIG. 4C.

In step 106, a state of the posture tilt mode is detected. When a detection result of step 106 is that the posture tilt mode is in an on state, step 107 may be performed. In step 107, when the state of the posture tilt mode is in the on state, the processing of controlling the posture of the virtual object to tilt to a left direction or a right direction of the virtual object is performed.

Exemplarily, it is confirmed that step 102 may be performed after step 107. When the detection result of step 106 is that the posture tilt mode is shielded, step 108 may be performed. In step 108, it is determined to be in a lens rotating mode, the lens of the virtual scene is controlled to rotate around the first rotation reference axis.

In some specific embodiments, the posture tilt mode has a corresponding setting switch. When an option of the setting switch is set to be in an on state, the posture tilt mode is turned on. As an example, the setting switch corresponding to the posture tilt mode may be displayed when the first rotation operation is received, or may be displayed in a setting list in the virtual scene. The on state of the posture tilt mode may be set before the first rotation operation is received, or may be set on a switch displayed when the first rotation operation is received.

In some embodiments, when the posture tilt mode is confirmed in the on state, the posture of the virtual object is controlled to tilt to the left direction or the right direction of the virtual object when the first rotation operation is received. When the posture tilt mode is confirmed to be in a shielded state, it is confirmed to be in the lens rotating mode. When the first rotation operation is received, the lens of the virtual scene is controlled to rotate according to the direction of the first rotation operation around the first rotation reference axis and a rotation angle is in positive correlation.

According to the object control method in the virtual scene provided by the embodiment of this application, the posture of the virtual object in the virtual scene is controlled to tilt or the lens of the virtual scene is controlled to rotate through a rotation operation for the electronic device. The traditional key operation is replaced by the rotation operation, the user does not need to simultaneously perform pressing operations with a plurality of fingers to control the posture of the virtual object or control the rotation of the lens. The convenience of operating by the user is improved, and the efficiency of controlling the virtual scene is improved. Meanwhile, the rotation operation and the posture tilt of the virtual object or the lens rotation of the virtual scene have the same direction and positively corrected angles, which enhances the sense of immersion of the user in the virtual scene, and brings a more realistic visual experience to the user.

An exemplary application of the embodiment of this application in an actual application scene will be described below.

In a solution of controlling the virtual object by the traditional key operation, a plurality of virtual interactive keys are often set on the human-computer interaction interface. The virtual interactive keys are associated with different actions of the virtual object or associated with different rotation directions of the lens of the virtual scene. When the user performs virtual lens rotation and virtual object posture control, a plurality of fingers need to be mobilized for the key operations (the key operations include, but is not limited to, clicking keys, long pressing the keys, dragging the keys, sliding a screen, and the like). The operation difficulty is increased, and the virtual keys excessively increase the obstruction rate of the human-computer interaction interface (on one hand, the virtual keys obstruct the human-computer interaction interface; and on the other hand, the region around the keys will also be obstructed when the user presses the virtual keys with fingers), which reduces the visual experience of the user.

For the above technical problems, an embodiment of this application provides an object control method in a virtual scene. The posture of the virtual object or the lens of the virtual scene is controlled through a rotation operation for the electronic device. The lens of the virtual scene may be rotated in different directions for different rotation reference axes, which improves the convenience of operation.

Exemplarily, refer to FIG. 5, which is a schematic axial diagram of an electronic device provided by an embodiment of this application. In FIG. 5, the electronic device is a mobile terminal. A display screen of the mobile terminal displays a human-computer interaction interface. When the mobile terminal is in a landscape mode, a first rotation reference axis (a YAW axis) is upward perpendicular to the human-computer interaction interface (a direction above a reference axis Z0 in FIG. 5), a second rotation reference axis (a ROLL axis) is parallel to a width direction of the human-computer interaction interface (a direction pointed by an arrow of a reference axis Y0 in FIG. 5), and a third rotation reference axis (a PITCH axis) is parallel to a length direction of the human-computer interaction interface (a direction pointed by an arrow of a reference axis X0 in FIG. 5). Similarly, when the electronic device is in a portrait mode, the first rotation reference axis (the YAW axis) is perpendicular to the human-computer interaction interface, then a positive direction is a direction opposite to the direction of viewing the display screen, that is, the direction pointed by the arrow of the reference axis Z0 in FIG. 5, the second rotation reference axis (the ROLL axis) is parallel to the length direction of the human-computer interaction interface, that is, the direction pointed by the arrow of the reference axis Y0 in FIG. 5, and the third rotation reference axis (the PITCH axis) is parallel to the width direction of the human-computer interaction interface, that is, the direction pointed by the arrow of the reference axis X0 in FIG. 5.

The first rotation reference axis, the second rotation reference axis, and the third rotation reference axis are perpendicular to one another. However, the direction of each rotation reference axis may be set according to actual needs. The embodiment of this application does not limit this.

In some another embodiments, for example: when the electronic device is a wearable virtual reality device, the ROLL axis is perpendicular to the human-computer interaction interface, passes through the human-computer interaction interface, and extends to the direction opposite to the direction of viewing the human-computer interaction interface; the PITCH axis is perpendicular to the width direction of the human-computer interaction interface and extends to the right side of the human-computer interaction interface; and the YAW axis is parallel to the length direction of the human-computer interaction interface and extends to the upper part of the human-computer interaction interface.

The embodiment of this application is described based on the direction of each rotation reference axis in FIG. 5 as an example.

Figure 8A:
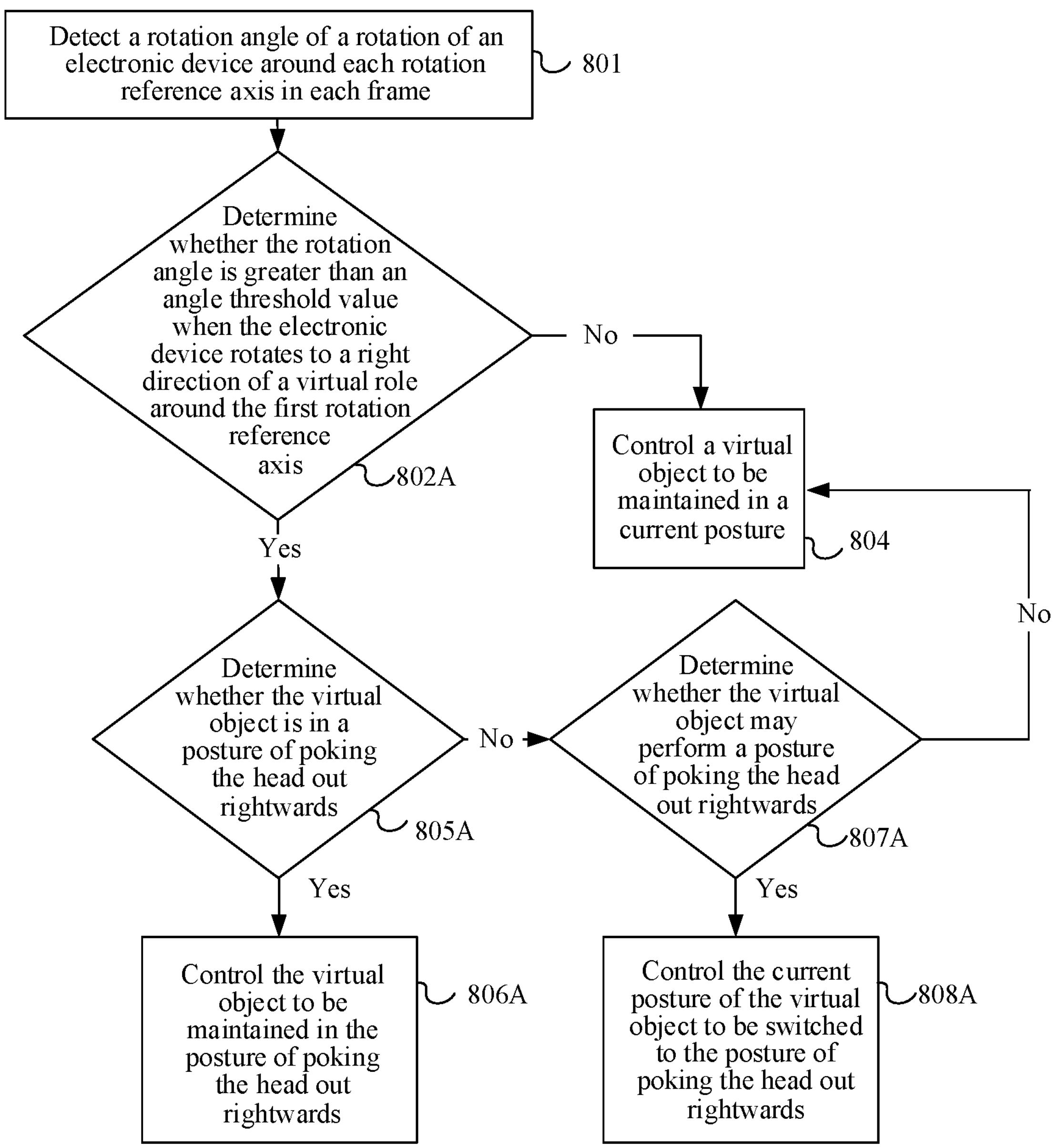
FIG. 8A is an optional schematic flowchart of an object control method in a virtual scene provided by an embodiment of this application.
Figure 8B:
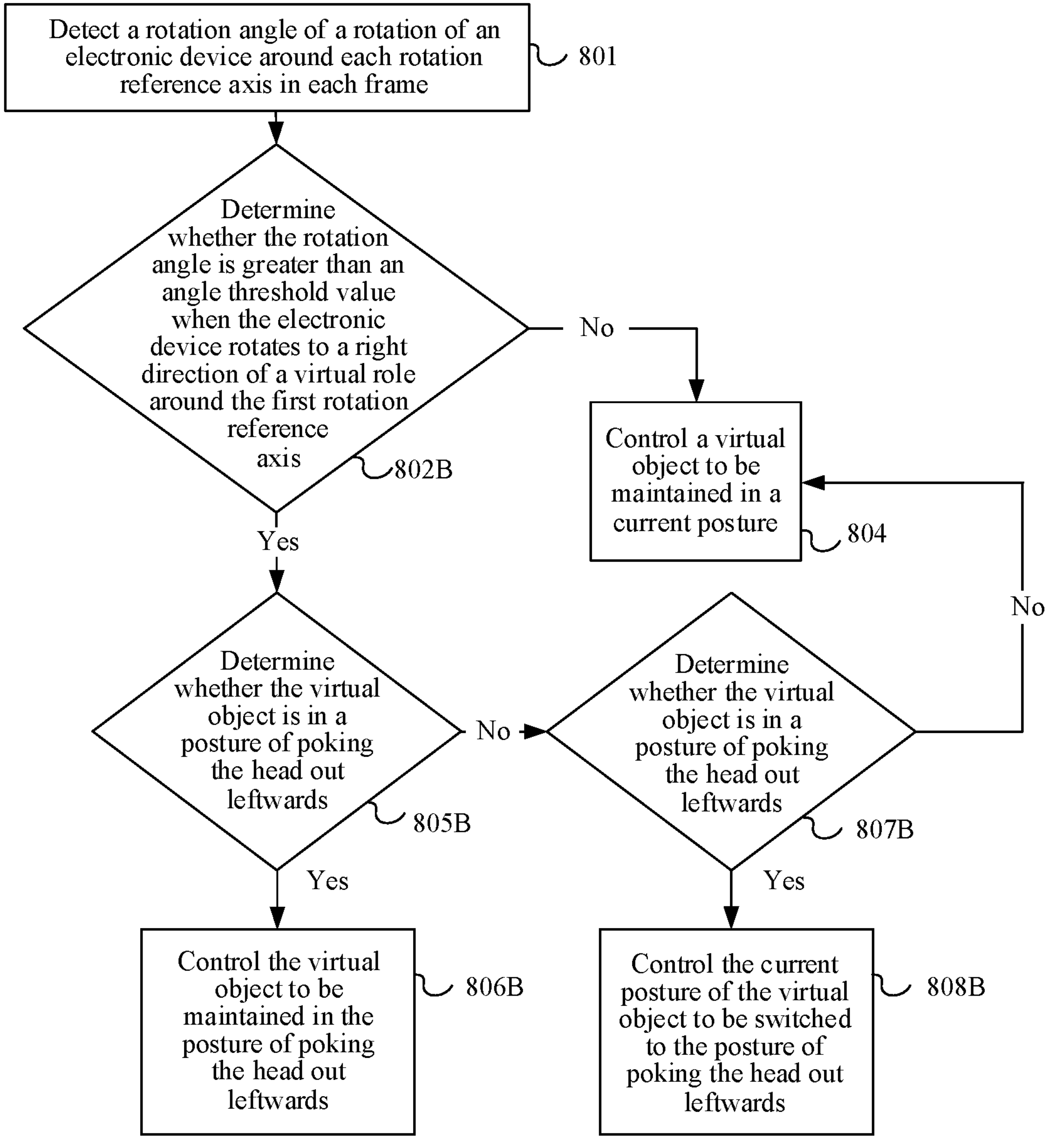
FIG. 8B is an optional schematic flowchart of an object control method in a virtual scene provided by an embodiment of this application.

A flowchart and a schematic diagram are combined for description below. Refer to FIG. 8A and FIG. 8B, which are optional schematic flowcharts of an object control method in a virtual scene provided by the embodiments of this application. Refer to FIG. 9A, FIG. 9B, and FIG. 9C, which are schematic diagrams of displaying a virtual scene in a human-computer interaction interface provided by the embodiments of this application.

Refer to FIG. 8A, which includes step 801: Detect a rotation angle of a rotation of an electronic device around each rotation reference axis when an image of each frame of virtual scene is displayed. Step 802A: Determine whether the rotation angle is greater than an angle threshold value when it is confirmed that the electronic device rotates to a right direction of a virtual role around the first rotation reference axis. If a determination result in step 802A is No, step 804 is performed: controlling a virtual object to be maintained in a current posture. If a determination result in step 802A is Yes, step 805A is performed: determining whether a virtual object is in a posture of poking the head out rightwards. If a determination result in step 805A is Yes, step 806A is performed: controlling the virtual object to be maintained in the posture of poking the head out rightwards. If a determination result in step 805A is No, step 807A is performed: determining whether the virtual object may perform the posture of poking the head out rightwards, if the determination result in step 807A is Yes, step 808A is performed: controlling the current posture of the virtual object to be switched to the posture of poking the head out rightwards. If a determination result in step 807A is No, step 804A is performed: controlling the virtual object to be maintained in the current posture.

In FIG. 8A, the virtual object is controlled to perform the posture of poking the head out rightwards, which may refer to FIG. 9A and FIG. 9C in visual representation.

Exemplarily, a gyroscope is arranged in the electronic device to detect the rotation operation for the electronic device. The gyroscope detects the rotation angle or the angular velocity of the electronic device each frame. The embodiment of this application is described by taking the angle as an example, as shown in FIG. 9A and FIG. 9B, the electronic device in the embodiment of this application is a mobile phone. The human-computer interaction interface of the electronic device displays a virtual scene. The virtual scene includes a virtual object 110. The embodiment of this application is described by taking an example in which the lens of the virtual scene faces the back of the virtual object 110 in a third-person perspective.

Exemplarily, refer to FIG. 9C, which shows an electronic device and a picture of the virtual scene displayed in the electronic device when any rotation operation is not performed. The virtual scene includes the virtual object 110. The virtual object is in an upright standing posture.

Exemplarily, refer to FIG. 9A, the rotation angle of the electronic device at the YAW axis acquired currently by the gyroscope is Y1. When the rotation angle Y1 is greater than the angle threshold value Y0, the virtual object 110 is controlled to preform corresponding posture tilt according to the direction of the first rotation operation and the rotation angle. Refer to FIG. 9A, the electronic device is subjected to the first rotation operation of clockwise rotating around the first rotation reference axis (the YAW axis). The straight line L1 in FIG. 9A is a straight line parallel to the width direction of the human-computer interaction interface. The straight line L2 is a position where the straight line L1 is located before the first rotation operation. An included angle formed by the two straight lines is the rotation angle Y1 of the first rotation operation around the YAW axis. In the current lens direction, the clockwise rotation is corresponding to the right side of the virtual object 110, the rotation angle Y1 is greater than the angle threshold value Y0, the posture of the virtual object 110 is tilted to the right direction of the virtual object 110. After tilting the posture, the center of gravity of the head and the center of gravity of the torso of the virtual object 110 are not located on the same vertical line. Referring to FIG. 9A, the tilt posture may be a posture of poking the head out rightwards. After the first rotation operation is ended, the electronic device is subjected to other rotation operations, and the rotation angle Y1 corresponding to the other rotation operations is less than the angle threshold value Y0, then the virtual object 110 is not maintained in the posture of poking the head out rightwards, and is restored to an original posture. When an initial posture of the virtual object 110 does not satisfy a condition of a posture of poking the head out rightwards, that is, the rotation angle Y1 of the first rotation operation is greater than the angle threshold value Y0, and the initial posture of the virtual object 110 is not switched to the posture of poking the head out rightwards. For example: when the initial posture of the virtual object 110 is a running posture, a swimming posture, a crouching state, or a driving state, a condition of poking the head out rightwards is not satisfied. If the rotation angle Y1 of the first rotation operation is greater than the angle threshold value Y0 at this moment, the posture of poking the head out rightwards cannot be performed.

Refer to FIG. 8B, which includes step 801: Detect a rotation angle of a rotation of an electronic device around each rotation reference axis in each frame. Step 802B: Determine whether the rotation angle is greater than an angle threshold value when it is confirmed that the electronic device rotates to a left direction of a virtual role around the first rotation reference axis. If a determination result in step 802B is No, step 804 is performed: controlling a virtual object to be maintained in a current posture. If a determination result in step 802B is Yes, step 805B is performed: determine whether a virtual object is in a posture of poking the head out leftwards. If a determination result in step 805B is Yes, step 806B is performed: controlling the virtual object to be maintained in the posture of poking the head out leftwards. If a determination result in step 805B is Yes, step 807B is performed: determining whether the virtual object may perform the posture of poking the head out leftwards, if the determination result in step 807B is Yes, step 808B is performed: controlling the current posture of the virtual object to be switched to the posture of poking the head out leftwards. If a determination result in step 807B is No, step 804 is performed: controlling the virtual object to be maintained in the current posture.

In FIG. 8B, the virtual object is controlled to perform the posture of poking the head out leftwards, which may refer to FIG. 9B in visual representation.

Exemplarily, refer to FIG. 9B, the electronic device is subjected to the first rotation operation of anticlockwise rotating around the first rotation reference axis (the YAW axis). In the current lens direction, the anticlockwise rotation is corresponding to the left side of the virtual object 110, an absolute value of the rotation angle Y2 is greater than an absolute value of the angle threshold value Y0, then the posture of the virtual object 110 is tilted to the left direction of the virtual object 110. After tilting the posture, the center of gravity of the head and the center of gravity of the torso of the virtual object 110 are not located on the same vertical line. Referring to FIG. 9B, the tilt posture may be a posture of poking the head out leftwards.

In some embodiments, the first rotation operation corresponds to different control modes. When a value of the angular velocity or the angle of the first rotation operation is in value space associated with the posture tilt mode, the posture of the virtual object is controlled to tilt. The posture tilt mode is a mode of controlling the virtual object to tilt through the first rotation operation. When a value of the angular velocity of the first rotation operation is in value space associated with a lens rotating mode, it is determined to be in the lens rotating mode, and the lens of the virtual scene is controlled to rotate around the first rotation reference axis. The lens rotating mode is a mode of controlling the lens of the virtual scene to rotate around the first rotation reference axis through the first rotation operation. The posture tilt mode and the lens rotating mode may also be turned on or off through a switch. When the posture tilt mode is shielded, the lens rotating mode is turned on; the lens rotating mode is shielded, the posture tilt mode is turned on; or the two modes can be shielded simultaneously.

Figure 8C:
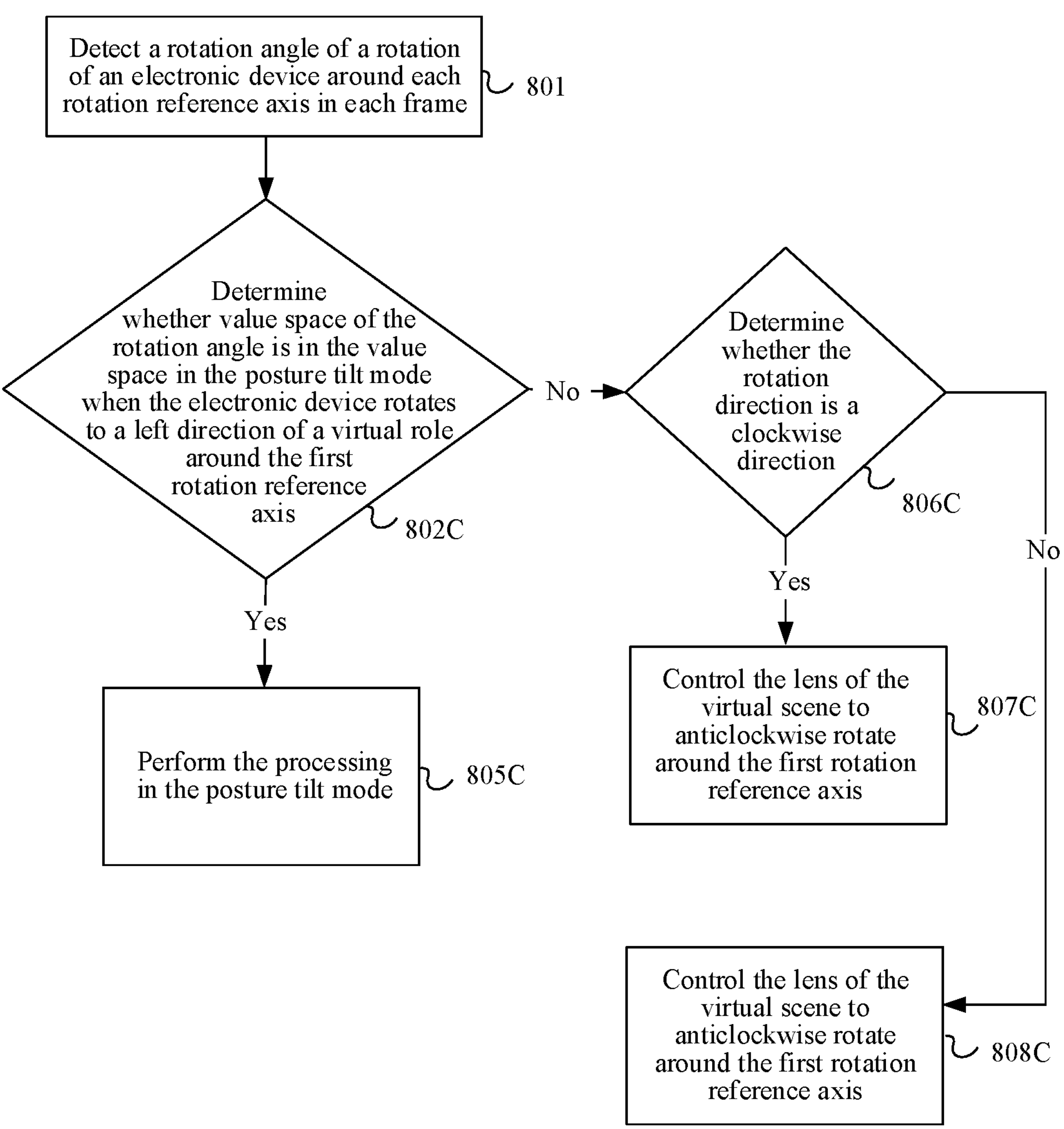
FIG. 8C is an optional schematic flowchart of an object control method in a virtual scene provided by an embodiment of this application.

FIG. 8C is a flowchart of an optional schematic flowchart of an object control method in a virtual scene provided by an embodiment of this application.

Refer to FIG. 8C, which includes step 801: Detect a rotation angle of a rotation of an electronic device around each rotation reference axis in each frame. Step 802C: Determine whether value space of the rotation angle is in the value space in the posture tilt mode when the electronic device rotates to a left direction of a virtual role around the first rotation reference axis. If the determination result in step 802C is Yes, step 805C is performed: performing the processing in the posture tilt mode; and the processing in the posture tilt mode may be represented by the process shown in FIG. 8A or FIG. 8B.

If the determination result in step 802C is Yes, step 806C is performed: determining whether the rotation direction is a clockwise direction. If the determination result in step 806C is No, step 808C is performed: controlling the lens of the virtual scene to anticlockwise rotate around the first rotation reference axis. If the determination result in step 806C is Yes, step 807C is performed: controlling the lens of the virtual scene to clockwise rotate around the first rotation reference axis.

Figure 10A:
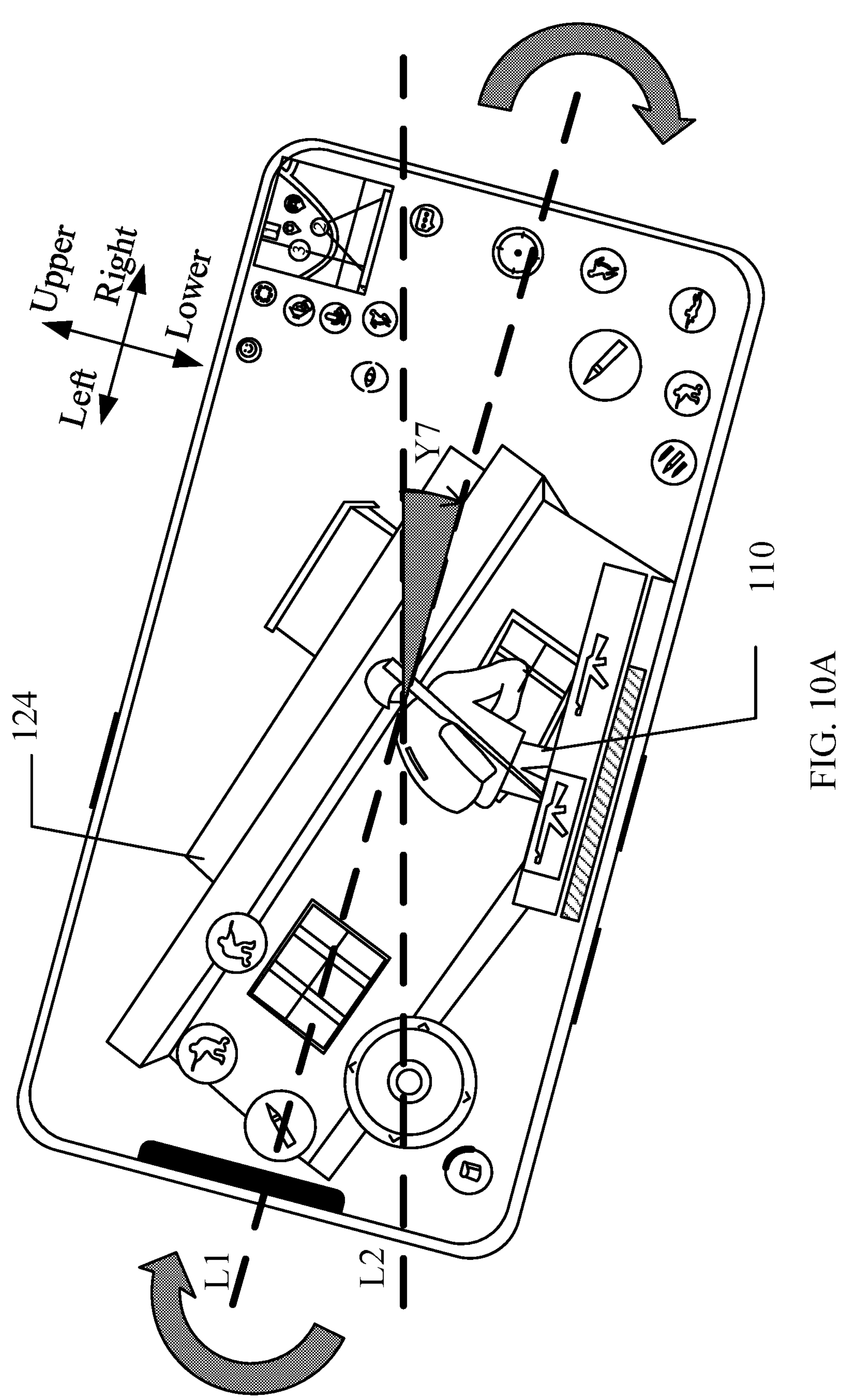
FIG. 10A is a schematic diagram of displaying a virtual scene in a human-computer interaction interface provided by an embodiment of this application.

Exemplarily, the lens rotating mode is explained and described. Refer to FIG. 10A, which is a schematic diagram of displaying a virtual scene in a human-computer interaction interface provided by an embodiment of this application. The lens rotating mode in FIG. 10A is corresponding to step 807C in FIG. 8C. In FIG. 10A, a virtual building 124 being a reference object is taken as an example for description. The virtual building 124 is a one story bungalow. The virtual buildings 124 below are the same virtual building. In the lens rotating mode, the electronic device is subjected to the first rotation operation of clockwise rotating around the first rotation reference axis (the YAW axis). The rotation angle is Y7, and the posture of the virtual object 110 is maintained in the original posture. The virtual scene in the human-computer interaction interface rotates clockwise around the first rotation reference axis along with the first rotation operation, and the rotation angle is in positive correlation with the rotation angle Y7 corresponding to the first rotation operation. The picture of the human-computer interaction interface is displayed as: the virtual building 124 and the virtual object 110 are tilted to the right side of the human-computer interaction interface together. The positional relationship among the virtual building 124, the virtual object 110, and the ground or sky in the virtual scene remains unchanged, and is only displayed as a tilted picture corresponding to the virtual scene.

Figure 10B:
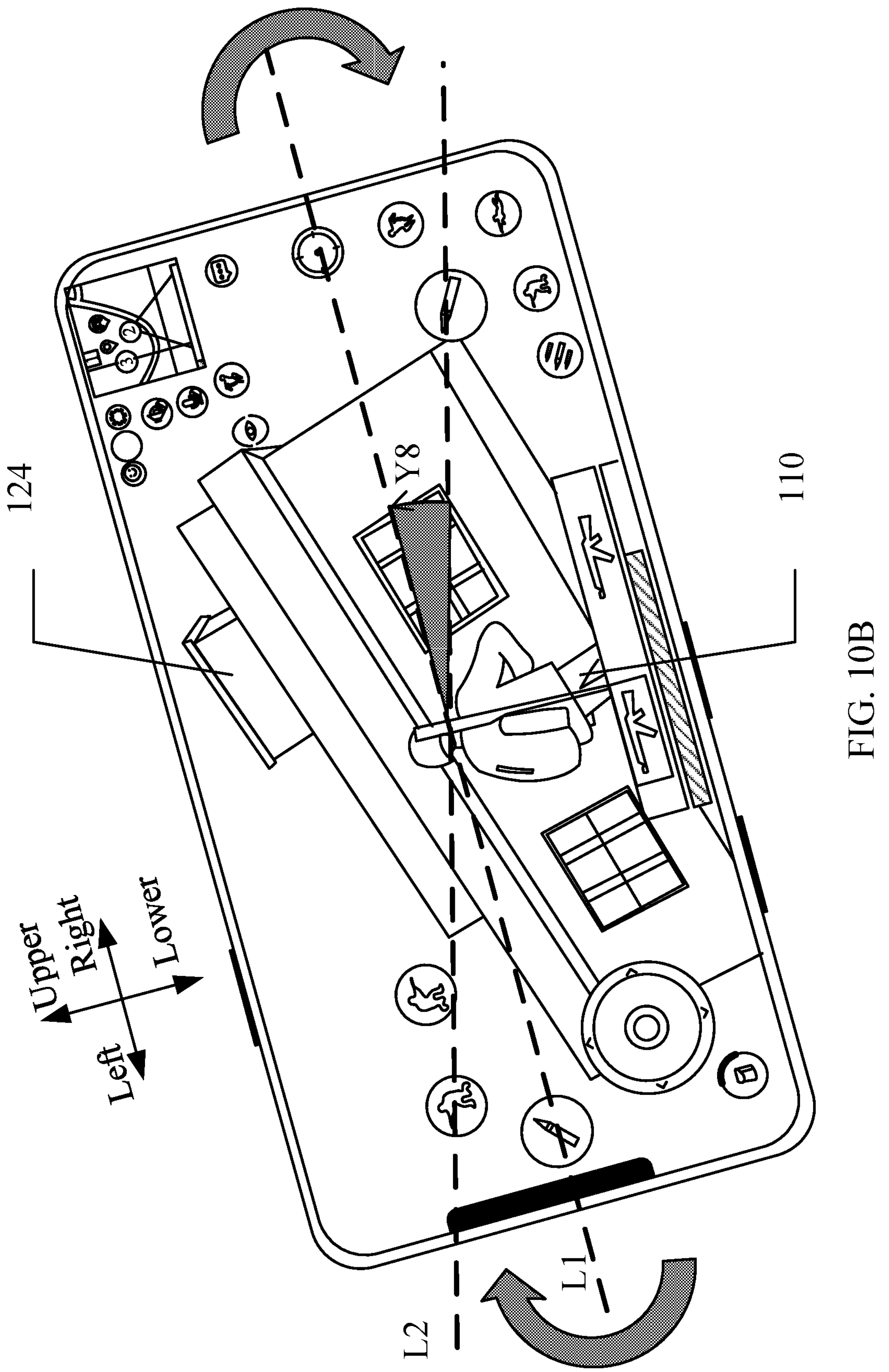
FIG. 10B is a schematic diagram of displaying a virtual scene in a human-computer interaction interface provided by an embodiment of this application.

Refer to FIG. 10B, which is a schematic diagram of displaying a virtual scene in a human-computer interaction interface provided by an embodiment of this application. In FIG. 10B, the lens rotating mode is corresponding to step 808C in FIG. 8C. In the lens rotating mode, the electronic device is subjected to the first rotation operation of anticlockwise rotating around the first rotation reference axis (the YAW axis). The rotation angle is Y8, and the posture of the virtual object (the virtual object in FIG. 10B is in a standing posture) is kept unaffected by the rotation of the lens (when the lens rotates, the center of gravity of the head of the virtual object and the center of gravity of the torso are located on the same vertical line). The virtual scene in the human-computer interaction interface rotates anticlockwise around the first rotation reference axis along with the first rotation operation, and the rotation angle is in positive correlation with the rotation angle Y8 corresponding to the first rotation operation. The picture of the human-computer interaction interface is displayed as: the virtual building 124 and the virtual object 110 are tilted to the left side of the human-computer interaction interface together. The positional relationship among the virtual building 124, the virtual object 110, and the ground or sky in the virtual scene remains unchanged, and is only displayed as the tilted picture corresponding to the virtual scene.

Exemplarily, the embodiment of this application is described by taking an example of a third-person perspective that the lens of the virtual scene is directly behind the virtual object. However, in practical application, in the third-person perspective, the lens of the virtual scene may be located in different directions. When the lens of the virtual scene is located in other directions of the virtual object, the position where the first rotation reference axis passes through the human-computer interaction interface is a center of the human-computer interaction interface. When the first rotation operation is performed, the lens of the virtual scene rotates around the first rotation reference axis that passes through the center position of the human-computer interaction interface. The rotation direction is the same as the first rotation operation direction, and the rotation angle is in positive correlation with the angle corresponding to the first rotation operation.

The following continues to describe an exemplary structure that the implementation of an object control apparatus 455 in a virtual scene provided by an embodiment of this application is a software module. In some embodiments, as shown in FIG. 2, the software module in the object control apparatus 455 in the virtual scene stored in a memory 440 may include: a display module 4551, configured to display a virtual scene in a human-computer interaction interface, the virtual scene including a virtual object; and a tilt control module 4552, configured to control a posture of the virtual object to tilt to a left direction or a right direction of the virtual object in response to a first rotation operation, a first reference axis corresponding to the first rotation operation being perpendicular to the human-computer interaction interface.

In some embodiments, the tilt control module 4552 is further configured to: control, according to a direction consistent with the rotation of the first rotation operation around first rotation reference axis, at least part including the head of the virtual object to tilt to the left direction or the right direction of the virtual object, tilt angles of various downward parts of the head of the virtual object decreasing in sequence, and all are in positive correlation with an angle of the rotation of the first rotation operation around the first rotation reference axis.

In some embodiments, the tilt control module 4552 is further configured to: control, when the angle of rotation of the first rotation operation around the first rotation reference axis to the left direction of the virtual object is greater than an angle threshold value, at least part including the head of the virtual object to tilt to the left direction of the virtual object; and control, when the angle of rotation of the first rotation operation around the first rotation reference axis to the right direction of the virtual object is greater than an angle threshold value, at least part including the head of the virtual object to tilt to the right direction of the virtual object.

In some embodiments, the tilt control module 4552 is further configured to: control, when the angle of rotation of the first rotation operation around the first rotation reference axis to the left direction of the virtual object is greater than an angle threshold value and an angular velocity is greater than an angular velocity threshold value, at least part including the head of the virtual object to tilt to the left direction of the virtual object; and control, when the angle of rotation of the first rotation operation around the first rotation reference axis to the right direction of the virtual object is greater than an angle threshold value and an angular velocity is greater than an angular velocity threshold value, at least part including the head of the virtual object to tilt to the right direction of the virtual object.

In some embodiments, the tilt control module 4552 is further configured to: acquiring historical operation data for a virtual object; and invoking a threshold value recognition model based on the historical operation data to obtain the angle threshold value and the angular velocity threshold value that are capable of being used for recognizing an abnormal operation for the virtual object.

The threshold value recognition model is trained through a rotation operation data sample and a responsive or non-responsive label marked by the rotation operation data sample.

In some embodiments, before controlling the posture of the virtual object to tilt to the left direction or the right direction of the virtual object, the tilt control module 4552 is further configured to: perform the processing of controlling a posture of the virtual object to tilt to a left direction or a right direction of the virtual object in response to a current posture of the virtual object satisfying a first condition, the first condition including: a body part, required to move for tilting based on the current posture, of the virtual object is not in a working state. In some embodiments, the first condition includes: a body part, required to move for tilting based on the current posture, of the virtual object is in a movable state.

In some embodiments, before controlling the posture of the virtual object to tilt to the left direction or the right direction of the virtual object, the tilt control module 4552 is further configured to: perform the processing of controlling a posture of the virtual object to tilt to a left direction or a right direction of the virtual object when a region around the virtual object satisfies a second condition, the second condition including: there is no factor causing the state decay to the virtual object in region. In some embodiments, the second condition includes: there is no danger to the virtual object in the region.

In some embodiments, before controlling the posture of the virtual object to tilt to the left direction or the right direction of the virtual object, the tilt control module 4552 is further configured to: display prompt information when the region does not satisfy the second condition, the prompt information is used for characterizing that there is a risk when the virtual object is in a tilt posture; and performing the processing of controlling a posture of the virtual object to tilt to a left direction or a right direction of the virtual object in response to the first rotation operation received again.

In some embodiments, before controlling the posture of the virtual object to tilt to the left direction or the right direction of the virtual object, the tilt control module 4552 is further configured to: perform the processing of controlling a posture of the virtual object to tilt to a left direction or a right direction of the virtual object when a region around the virtual object satisfies a third condition, the third condition includes: there is no obstacle that prevents the virtual object from tilting to the left direction or the right direction in the direction consistent with the rotation of the first rotation operation around the first rotation reference axis in the region.

In some embodiments, the tilt control module 4552 is further configured to: control, according to the direction consistent with the rotation of the second rotation operation around the second rotation reference axis, the lens of the virtual scene to rotate, a rotation angle of the lens of the virtual scene being in positive correlation with the angle of rotation of the second rotation operation around the second rotation reference axis.

In some embodiments, the lens of the virtual scene is controlled to rotate according to the direction consistent with the rotation of the third rotation operation around the third rotation reference axis, a rotation angle of the lens of the virtual scene being in positive correlation with the angle of rotation of the third rotation operation around the third rotation reference axis.

In some embodiments, before controlling the posture of the virtual object to tilt to the left direction or the right direction of the virtual object, the tilt control module 4552 is further configured to: determine, when a value of the angular velocity of the first rotation operation is in value space associated with a posture tilt mode, that the virtual object is in the posture tilt mode, and perform the processing of controlling the posture of the virtual object to tilt to a left direction or a right direction of the virtual object, the posture tilt mode being a mode of controlling the virtual object to tilt through the first rotation operation.

In some embodiments, the tilt control module 4552 is further configured to: determine, when a value of the angular velocity of the first rotation operation is in value space associated with a lens rotating mode, that the virtual object is in a lens rotating mode, and control the lens of the virtual scene to rotate around first rotation reference axis, a rotation angle of the lens of the virtual scene being in positive correlation with angle of rotation of the first rotation operation around first rotation reference axis.

In some embodiments, before controlling the posture of the virtual object to tilt to the left direction or the right direction of the virtual object, the tilt control module 4552 is further configured to: detect a state of the posture tilt mode, the state of the posture tilt mode being set on a switch displayed in response to first rotation operation, or being set before receiving the first rotation operation. When the state of the posture tilt mode is in the on state, the processing of controlling the posture of the virtual object to tilt to a left direction or a right direction of the virtual object is performed.

When the state of the posture tilt mode is in a shielded state, the tilt control module 4552 is further configured to: determine to be in a lens rotating mode, and control the lens of the virtual scene to rotate around first rotation reference axis, a rotation angle of the lens of the virtual scene being in positive correlation with angle of rotation of the first rotation operation around first rotation reference axis.

In some specific embodiments, the first rotation operation, the second rotation operation, and the third rotation operation are implemented for the terminal device, and the terminal device is configured to display the human-computer interaction interface; or, the first rotation operation, the second rotation operation, and the third rotation operation are implemented for a wearable device or a handle device, the wearable device or the handle device is configured to transmit a corresponding control signal to the terminal device, and the terminal device is configured to display the human-computer interaction interface.

An embodiment of this application provides a computer program product or a computer program. The computer program product or the computer program includes computer instructions. The computer instructions are stored in a computer-readable storage medium. A processor of a computer device reads the computer instructions from the computer-readable storage medium, and the processor executes the computer instructions to enable the computer device to perform the above object control method in a virtual scene of the embodiment of this application.

An embodiment of this application provides a computer-readable storage medium storing executable instructions, which is stored with the executable instructions. When the executable instructions are executed by the processor, a processor will perform the object control method in a virtual scene provided by an embodiment of this application, for example, the object control method in the virtual scene as shown in FIG. 3A.

In some embodiments, the computer storage medium may be a memory such as a ferroelectric random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, a compact disc, or a compact disc-read-only memory (CD-ROM), or may be various devices including one of or any combination of the above memories.

In some embodiments, the executable instructions may be in the form of a program, software, a software module, a script, or code, programmed in any form of programming language (including compiled or interpreted languages, or declarative or procedural languages), may be deployed in any form, and includes other units that are deployed as a standalone program or as a module, component, subroutine, or are suitable to be used in a computing environment.

As an example, the executable instructions may be, but not necessarily, corresponding to a file in a file system, may be stored in a part of the file for saving other programs or data, for example, stored in one or more scripts in a hyper text markup language (HTML) file, stored in a single file specifically used for the program being discussed, or stored in a plurality of collaborative files (for example, a file storing one or more modules, a submodule, or a code part).

As an example, the executable instructions may be deployed on a computing device for executing, or executed on a plurality of computing devices located at a location, or executed on a plurality of computing devices distributed in a plurality of locations and interconnected through communication networks.

In conclusion, rotation operations are performed around different rotation reference axes corresponding to a terminal device to control the posture of the virtual object in the virtual scene displayed in the human-computer interaction interface or control the lens of the virtual scene. The posture of the virtual object or the lens of the virtual scene is controlled by rotation operations instead of traditional key operations. The user does not need to perform pressing operations with a plurality of fingers to control the posture of the virtual object or control the rotation of the lens, which improves the convenience of operation, and improves the efficiency of controlling the virtual scene. In another aspect, the keys set on the human-computer interaction interface are saved, and the obstruction of the human-computer interaction interface is reduced. The posture tilt mode and the lens rotating mode are set, which enriches the types that can be controlled by the rotation operation, and improves the degree of freedom of the operation, and improves the visual experience of the user.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely preferred embodiments of this application and are not intended to limit the protection scope of this application. Any modification, equivalent replacement, or improvement made without departing from the spirit and principle of this application shall fall within the protection scope of this application.

What is claimed is:

1. A method of controlling an object in a virtual scene performed by a handheld terminal device, the method comprising:

displaying a virtual scene in an interaction interface of the terminal device, the virtual scene comprising a virtual object and other objects, wherein the virtual object is at a first location in a virtual environment and controlled by a user of the terminal device;

determining when a current posture of the virtual object satisfies a condition for the virtual object to tilt; wherein the condition comprises:

(i) a first condition that a body part of the virtual object, required to move for tilting based on the current posture, is in a movable state; and (ii) a second condition that there is no danger to the virtual object in the virtual scene;

controlling a posture of the virtual object to tilt to a left direction or a right direction of the virtual object from the current posture of the virtual object while the virtual object remains at the first location in the virtual environment in response to a first rotation operation of the terminal device by a first angle around a first reference axis perpendicular to the interaction interface by the user of the terminal device, further including:

rotating the first virtual object and the other objects in the virtual scene around the first rotation reference axis by the first angle around the first reference axis perpendicular to the interaction interface;

controlling at least a head of the virtual object to tilt to the left direction or the right direction of the virtual object by a second angle when the first angle around the first rotation reference axis exceeds a predefined threshold; and displaying the virtual scene in a viewing perspective corresponding to the tilted posture of the virtual object.

2. The method according to claim 1, wherein the virtual object has a tilted perspective in the virtual environment that corresponds to a position of the head of the virtual object after the head of the object is tilted by the second angle.

3. The method according to claim 1, wherein the controlling at least the head of the virtual object to tilt to the left direction or the right direction of the virtual object by a second angle comprises:

controlling, when the first angle of rotation of the first rotation operation around the first rotation reference axis to the left direction of the virtual object is greater than an angle threshold value and an angular velocity of the first rotation operation is greater than an angular velocity threshold value, at least the head of the virtual object to tilt to the left direction of the virtual object by the second angle; and controlling, when the first angle of rotation of the first rotation operation around the first rotation reference axis to the right direction of the virtual object is greater than the angle threshold value and the angular velocity of the first rotation operation is greater than the angular velocity threshold value, at least the head of the virtual object to tilt to the right direction of the virtual object by the second angle.

4. The method according to claim 1, wherein the condition further comprises:

(iii) a third condition that there is no obstacle that prevents the virtual object from tilting to the left direction or the right direction in a direction consistent with the rotation of the first rotation operation around the first rotation reference axis in the virtual scene.

5. The method according to claim 1, wherein, before the controlling a posture of the virtual object to tilt to a left direction or a right direction of the virtual object, the method further comprises:

when an angular velocity of the first rotation operation is within a range associated with a posture tilt mode, determining that the virtual object is in the posture tilt mode, the posture tilt mode being a mode of controlling the virtual object to tilt through the first rotation operation.

6. The method according to claim 1, wherein the first rotation operation is implemented for a wearable device or a handle device, the wearable device or the handle device is configured to transmit a corresponding control signal to the terminal device, and the terminal device is configured to display the virtual scene in the interaction interface of the terminal device; or the first rotation operation is implemented for the terminal device, and the terminal device is configured to display the virtual scene in the interaction interface of the terminal device.

7. A terminal device, the terminal device being a handheld device and comprising:

a memory, configured to store executable instructions; and a processor, configured to, when executing the executable instructions stored in the memory, cause the terminal device to perform a method of controlling an object in a virtual scene, the method including:

displaying a virtual scene in an interaction interface of the terminal device, the virtual scene comprising a virtual object and other objects, wherein the virtual object is at a first location in a virtual environment and controlled by a user of the terminal device;

determining when a current posture of the virtual object satisfies a condition for the virtual object to tilt; wherein the condition comprises:

(i) a first condition that a body part of the virtual object, required to move for tilting based on the current posture, is in a movable state; and (ii) a second condition that there is no danger to the virtual object in the virtual scene;

controlling a posture of the virtual object to tilt to a left direction or a right direction of the virtual object from the current posture of the virtual object while the virtual object remains at the first location in the virtual environment in response to a first rotation operation of the terminal device by a first angle around a first reference axis perpendicular to the interaction interface by the user of the terminal device, further including:

rotating the first virtual object and the other objects in the virtual scene around the first rotation reference axis by the first angle around the first reference axis perpendicular to the interaction interface;

controlling at least a head of the virtual object to tilt to the left direction or the right direction of the virtual object by a second angle when the first angle around the first rotation reference axis exceeds a predefined threshold; and displaying the virtual scene in a viewing perspective corresponding to the tilted posture of the virtual object.

8. The terminal device according to claim 7, wherein the virtual object has a tilted perspective in the virtual environment that corresponds to a position of the head of the virtual object after the head of the object is tilted by the second angle.

9. The terminal device according to claim 7, wherein the controlling at least a head of the virtual object to tilt to the left direction or the right direction of the virtual object by a second angle comprises:

controlling, when the first angle of rotation of the first rotation operation around the first rotation reference axis to the left direction of the virtual object is greater than an angle threshold value and an angular velocity of the first rotation operation is greater than an angular velocity threshold value, at least the head of the virtual object to tilt to the left direction of the virtual object by the second angle; and controlling, when the first angle of rotation of the first rotation operation around the first rotation reference axis to the right direction of the virtual object is greater than the angle threshold value and the angular velocity of the first rotation operation is greater than the angular velocity threshold value, at least the head of the virtual object to tilt to the right direction of the virtual object by the second angle.

10. The terminal device according to claim 7, wherein the condition further comprises:

(iii) a third condition that there is no obstacle that prevents the virtual object from tilting to the left direction or the right direction in a direction consistent with the rotation of the first rotation operation around the first rotation reference axis in the virtual scene.

11. The terminal device according to claim 7, wherein, before the controlling a posture of the virtual object to tilt to a left direction or a right direction of the virtual object, the method further comprises:

when an angular velocity of the first rotation operation is within a range associated with a posture tilt mode, determining that the virtual object is in the posture tilt mode, the posture tilt mode being a mode of controlling the virtual object to tilt through the first rotation operation.

12. The terminal device according to claim 7, wherein the first rotation operation is implemented for a wearable device or a handle device, the wearable device or the handle device is configured to transmit a corresponding control signal to the terminal device, and the terminal device is configured to display the virtual scene in the interaction interface of the terminal device; or the first rotation operation is implemented for the terminal device, and the terminal device is configured to display the virtual scene in the interaction interface of the terminal device.

13. A non-transitory computer-readable storage medium, storing executable instructions that, when executed by a processor of a handheld terminal device, cause the handheld terminal device to perform a method of controlling an object in a virtual scene, the method including:

displaying a virtual scene in an interaction interface of the terminal device, the virtual scene comprising a virtual object and other objects, wherein the virtual object is at a first location in a virtual environment and controlled by a user of the terminal device;

determining when a current posture of the virtual object satisfies a condition for the virtual object to tilt; wherein the condition comprises:

(i) a first condition that a body part of the virtual object, required to move for tilting based on the current posture, is in a movable state; and (ii) a second condition that there is no danger to the virtual object in the virtual scene;

controlling a posture of the virtual object to tilt to a left direction or a right direction of the virtual object from the current posture of the virtual object while the virtual object remains at the first location in the virtual environment in response to a first rotation operation of the terminal device by a first angle around a first reference axis perpendicular to the interaction interface by the user of the terminal device, further including:

rotating the first virtual object and the other objects in the virtual scene around the first rotation reference axis by the first angle around the first reference axis perpendicular to the interaction interface;

controlling at least a head of the virtual object to tilt to the left direction or the right direction of the virtual object by a second angle when the first angle around the first rotation reference axis exceeds a predefined threshold; and displaying the virtual scene in a viewing perspective corresponding to the tilted posture of the virtual object.

14. The non-transitory computer-readable storage medium according to claim 13, wherein the virtual object has a tilted perspective in the virtual environment that corresponds to a position of the head of the virtual object after the head of the object is tilted by the second angle.

15. The non-transitory computer-readable storage medium according to claim 13, wherein the controlling at least a head of the virtual object to tilt to the left direction or the right direction of the virtual object by a second angle comprises:

controlling, when the first angle of rotation of the first rotation operation around the first rotation reference axis to the left direction of the virtual object is greater than an angle threshold value and an angular velocity of the first rotation operation is greater than an angular velocity threshold value, at least the head of the virtual object to tilt to the left direction of the virtual object by the second angle; and controlling, when the first angle of rotation of the first rotation operation around the first rotation reference axis to the right direction of the virtual object is greater than the angle threshold value and the angular velocity of the first rotation operation is greater than the angular velocity threshold value, at least the head of the virtual object to tilt to the right direction of the virtual object by the second angle.

16. The non-transitory computer-readable storage medium according to claim 13, wherein, before the controlling a posture of the virtual object to tilt to a left direction or a right direction of the virtual object, the method further comprises:

when an angular velocity of the first rotation operation is within a range associated with a posture tilt mode, determining that the virtual object is in the posture tilt mode, the posture tilt mode being a mode of controlling the virtual object to tilt through the first rotation operation.

17. The non-transitory computer-readable storage medium according to claim 13, wherein the first rotation operation is implemented for a wearable device or a handle device, the wearable device or the handle device is configured to transmit a corresponding control signal to the terminal device, and the terminal device is configured to display the virtual scene in the interaction interface of the terminal device; or the first rotation operation is implemented for the terminal device, and the terminal device is configured to display the virtual scene in the interaction interface of the terminal device.

* * * * *